US008938376B2

(12) United States Patent
Hollis

(10) Patent No.: US 8,938,376 B2
(45) Date of Patent: *Jan. 20, 2015

(54) SIMULATING THE TRANSMISSION AND SIMULTANEOUS SWITCHING OUTPUT NOISE OF SIGNALS IN A COMPUTER SYSTEM

(71) Applicant: Micron Technology, Inc., Boise, ID (US)

(72) Inventor: Timothy Hollis, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/959,360

(22) Filed: Aug. 5, 2013

(65) Prior Publication Data

US 2013/0317796 A1 Nov. 28, 2013

Related U.S. Application Data

(63) Continuation of application No. 12/838,120, filed on Jul. 16, 2010, now Pat. No. 8,504,334.

(51) Int. Cl.
*G06F 17/50* (2006.01)

(52) U.S. Cl.
CPC ........ *G06F 17/5009* (2013.01); *G06F 17/5036* (2013.01); *G06F 2217/10* (2013.01); *G06F 2217/82* (2013.01)
USPC ........ 703/2; 703/6; 703/18; 703/19; 375/341; 455/422.1

(58) Field of Classification Search
USPC ............. 703/2, 6, 18, 19; 455/422.1; 375/341
See application file for complete search history.

(56) References Cited

U.S. PATENT DOCUMENTS

| | | | | |
|---|---|---|---|---|
| 5,175,558 | A * | 12/1992 | DuPree | 342/378 |
| 5,414,738 | A * | 5/1995 | Bienz | 375/341 |
| 7,395,056 | B2 * | 7/2008 | Petermann | 455/422.1 |
| 7,522,661 | B2 | 4/2009 | Nelson et al. | |
| 7,551,921 | B2 * | 6/2009 | Petermann | 455/422.1 |
| 7,656,815 | B2 * | 2/2010 | Kellerer et al. | 370/252 |
| 7,720,654 | B2 | 5/2010 | Hollis | |

(Continued)

OTHER PUBLICATIONS

"Advanced Design System product by Agilent", [Online]. Retrived from the Internet: <http:/ /www.home.agilent.com/agilent/product.jspx?cc=US&Ic=eng&ckey=1297113 &nid=-34346.0.00&id=1297113>.

(Continued)

*Primary Examiner* — Thai Phan
(74) *Attorney, Agent, or Firm* — Schwegman Lundberg & Woessner, P.A.

(57) ABSTRACT

Methods implementable in a computer system for simulating the transmission of signals across a plurality of data channels (bus) are disclosed. The disclosed techniques simulate the effects of Intersymbol Interference (ISI), cross talk, and Simultaneous Switching Output (SSO) noise by generating Probability Distribution Functions (PDFs) for each. The resulting PDFs are convolved to arrive at a total PDF indicative of the reception of data subject to each of these non-idealities. The total PDF, and its underlying terms, can be indexed to particular channels of the bus as well as to particular logic states. Use of the disclosed technique allows bit error rates and sensing margins to be determined with minimal computation and simulation.

22 Claims, 32 Drawing Sheets

(56) References Cited

U.S. PATENT DOCUMENTS

| | | | | |
|---|---|---|---|---|
| 7,930,139 | B2 | 4/2011 | Yamaguchi et al. | |
| 8,504,334 | B2 | 8/2013 | Hollis et al. | |
| 2002/0144272 | A1 | 10/2002 | McLain et al. | |
| 2005/0080574 | A1 | 4/2005 | Draving | |
| 2005/0182807 | A1 | 8/2005 | Ramaswamy et al. | |
| 2006/0259627 | A1* | 11/2006 | Kellerer et al. | 709/227 |
| 2006/0268933 | A1* | 11/2006 | Kellerer et al. | 370/469 |
| 2009/0094302 | A1 | 4/2009 | Hollis | |
| 2009/0110116 | A1 | 4/2009 | Hollis | |
| 2012/0016650 | A1 | 1/2012 | Hollis | |

OTHER PUBLICATIONS

"Nexxim product by Ansoft", [Online]. Retrived from the Internet: <http:/ /www.ansoft.com/products/hf/nexxim/>.

"Stateye V.4.2.3 Documentation", (2007).

Casper, B K, et al., "An accurate and Efficient Analysis Method for Multi-Gb/s Chip-to-Chip Signaling Schemes", 2002 Symposium on VLSI Circuits Digest of Technical Papers, (2002), 54-57.

* cited by examiner

Fig. 6 Fig. 7 Fig. 8

$$PDF_{TOT}(i,n)_1 = PDF_{ISI}(i,n)_1 * PDF_{XTALK}(i,n)_1 * PDF_{SSO}(i,n)_1$$

$$PDF_{TOT}(i,n)_0 = PDF_{ISI}(i,n)_0 * PDF_{XTALK}(i,n)_0 * PDF_{SSO}(i,n)_0$$

*or*

$$PDF_{TOT}(i,n) = PDF_{ISI}(i,n) * PDF_{XTALK}(i,n) * PDF_{SSO}(i,n)$$

*Figure 5*

$$PDF_{ISI}(i,n) = (X(i,n)_0, Z(i,n)_0) * (X(i,n)_{-1}, Z(i,n)_{-1}) * (X(i,n)_{-2}, Z(i,n)_{-2}) * \ldots * (X(i,n)_1, Z(i,n)_1) * (X(i,n)_2, Z(i,n)_2) * \ldots$$

$$= (0.75, 0) * (0.15, 0) * (-0.025, 0) * \ldots * (0.2, 0) * (-0.15, 0) * \ldots$$

*or*

$$PDF_{ISI}(i,n)_1 = X(i,n)_0 * (X(i,n)_{-1}, 0) * (X(i,n)_{-2}, 0) * \ldots * (X(i,n)_1, 0) * (X(i,n)_2, 0) * \ldots$$

$$= 0.75 * (0.15, 0) * (-0.025, 0) * \ldots * (0.2, 0) * (-0.15, 0) * \ldots$$

$$PDF_{ISI}(i,n)_0 = \underline{\mathbf{Y(i,n)_0}} * (Y'(i,n)_{-1}, 0) * (Y'(i,n)_{-2}, 0) * \ldots * (Y'(i,n)_1, 0) * (Y'(i,n)_2, 0) * \ldots$$

$$= \mathbf{0.27} * (-0.18, 0) * (0.03, 0) * \ldots * (-0.22, 0) * (0.1, 0) * \ldots$$

| | positve pulse 20 | negative pulse 30 | positve pulse 20 | negative pulse 30 | positve pulse 20 | negative pulse 30 | positve pulse 20 | negative pulse 30 |
|---|---|---|---|---|---|---|---|---|
| channel a | X(a) | Y(a) | $C(b,a)_1$ | $C(b,a)_0$ | $C(c,a)_1$ | $C(c,a)_0$ | $C(d,a)_1$ | $C(d,a)_0$ |
| channel b | $C(a,b)_1$ | $C(a,b)_0$ | X(b) | Y(b) | $C(c,b)_1$ | $C(c,b)_0$ | $C(d,b)_1$ | $C(d,b)_0$ |
| channel c | $C(a,c)_1$ | $C(a,c)_0$ | $C(b,c)_1$ | $C(b,c)_0$ | X(c) | Y(c) | $C(d,c)_1$ | $C(d,c)_0$ |
| channel d | $C(a,d)_1$ | $C(a,d)_0$ | $C(b,d)_1$ | $C(b,d)_0$ | $C(c,d)_1$ | $C(c,d)_0$ | X(d) | Y(d) |

*Figure 7B*

| | any pulse | any pulse | any pulse | any pulse |
|---|---|---|---|---|
| channel a | X(a) | C(b,a) | C(c,a) | C(d,a) |
| channel b | C(a,b) | X(b) | C(c,b) | C(d,b) |
| channel c | C(a,c) | C(b,c) | X(c) | C(d,c) |
| channel d | C(a,d) | C(b,d) | C(c,d) | X(d) |

*Figure 7C*

| | any pulse | any pulse | any pulse | any pulse |
|---|---|---|---|---|
| channel a | X(a) | C(b,a) | n/a | n/a |
| channel b | C(a,b) | X(b) | C(c,b) | n/a |
| channel c | n/a | C(b,c) | X(c) | C(d,c) |
| channel d | n/a | n/a | C(c,d) | X(d) |

*Figure 7D*

*across all UIs of interest*

$$PDF_{XTALK}(i,n)_1 = (C(n,m_1 \neq n)_1(i), 0) * (C(n,m_2 \neq n)_1(i), 0) * (C(n,m_3 \neq n)_1(i), 0) * \ldots$$

$$PDF_{XTALK}(i,n)_0 = (C(n,m_1 \neq n)_0(i),0) * (C(n,m_2 \neq n)_0(i),0) * (C(n,m_3 \neq n)_0(i),0) * \ldots.$$

*E.g.,:*

$$PDF_{XTALK}(i,a)_1 = (C(a,b)_1(i), 0) * (C(a,c)_1(i), 0) * (C(a,d)_1(i), 0) * \ldots$$

$$= (0.02, 0) * (-0.01, 0) * (0.04, 0) * (0.03, 0) * (0.01, 0) * \ldots$$
$$(0.01, 0) * (-0.01, 0) * (0.025, 0) * (-0.01, 0) * (0.01,0) * \ldots$$

I

| $PDF_{SSO,XTALK}(i,a)_0$ |
|---|
| $PDF_{SSO,XTALK}(i,a)_1$ |
| $PDF_{SSO,XTALK}(i,b)_0$ |
| $PDF_{SSO,XTALK}(i,b)_1$ |
| $PDF_{SSO,XTALK}(i,c)_0$ |
| $PDF_{SSO,XTALK}(i,c)_1$ |
| $PDF_{SSO,XTALK}(i,d)_0$ |
| $PDF_{SSO,XTALK}(i,d)_1$ |

*or*

II

| $PDF_{SSO,XTALK}(i,a)$ |
|---|
| $PDF_{SSO,XTALK}(i,b)$ |
| $PDF_{SSO,XTALK}(i,c)$ |
| $PDF_{SSO,XTALK}(i,d)$ |

*or*

III

| $PDF_{SSO,XTALK}(i)_1$ |
|---|
| $PDF_{SSO,XTALK}(i)_0$ |

*or*

IV

| $PDF_{SSO,XTALK}(i)$ |
|---|

$$PDF_{TOT}(i,n)_1 = PDF_{ISI}(i,n)_1 * PDF_{SSO,XTALK}(i,n)_1$$

$$PDF_{TOT}(i,n)_0 = PDF_{ISI}(i,n)_0 * PDF_{SSO,XTALK}(i,n)_0$$

*or*

$$PDF_{TOT}(i,n) = PDF_{ISI}(i,n) * PDF_{SSO,XTALK}(i,n)$$

Figure 11A

$$PDF_{TOT}(i,n)_1 = PDF_{ISI}(i,n)_1 * PDF_{SSO}(i,n)_1$$
$$PDF_{TOT}(i,n)_0 = PDF_{ISI}(i,n)_0 * PDF_{SSO}(i,n)_0$$

*or*

$$PDF_{TOT}(i,n) = PDF_{ISI}(i,n) * PDF_{SSO}(i,n)$$

Figure 11B

$$PDF_{TOT}(i,n)_1 = PDF_{ISI}(i,n)_1 * PDF_{XTALK}(i,n)_1 * PDF_{SSO}(i,n)_1$$
$$PDF_{TOT}(i,n)_0 = PDF_{ISI}(i,n)_0 * PDF_{XTALK}(i,n)_0 * PDF_{SSO}(i,n)_0$$

*or*

$$PDF_{TOT}(i,n) = PDF_{ISI}(i,n) * PDF_{XTALK}(i,n) * PDF_{SSO}(i,n)$$

from channels neighboring 'n' only

Figure 11C

$$PDF_{TOT}(i,n)_1 = PDF_{ISI}(i,n)_1 * PDF_{XTALK}(i,n)_1 * PDF_{SSO}(i)_1$$
$$PDF_{TOT}(i,n)_0 = PDF_{ISI}(i,n)_0 * PDF_{XTALK}(i,n)_0 * PDF_{SSO}(i)_0$$

*or*

$$PDF_{TOT}(i,n) = PDF_{ISI}(i,n) * PDF_{XTALK}(i,n) * PDF_{SSO}(i)$$

Figure 11D

$$PDF_{TOT}(i)_1 = PDF_{ISI}(i)_1 * PDF_{XTALK}(i)_1 * PDF_{SSO}(i)_1$$
$$PDF_{TOT}(i)_0 = PDF_{ISI}(i)_0 * PDF_{XTALK}(i)_0 * PDF_{SSO}(i)_0$$

*or*

$$PDF_{TOT}(i) = PDF_{ISI}(i) * PDF_{XTALK}(i) * PDF_{SSO}(i)$$

Figure 11E

$$PDF_{TOT}(i,n)_1 = PDF_{ISI}(i,n)_1 * PDF_{XTALK}(i,n) * PDF_{SSO}(i,n)$$
$$PDF_{TOT}(i,n)_0 = PDF_{ISI}(i,n)_0 * PDF_{XTALK}(i,n) * PDF_{SSO}(i,n)$$

*or*

$$PDF_{TOT}(i,n) = PDF_{ISI}(i,n) * PDF_{XTALK}(i,n) * PDF_{SSO}(i,n)$$

Figure 11F

$$PDF_{TOT}(i,n)_1 = PDF_{ISI}(i,n)_1 * PDF_{SSO,XTALK}(i,n)$$
$$PDF_{TOT}(i,n)_0 = PDF_{ISI}(i,n)_0 * PDF_{SSO,XTALK}(i,n)$$

*or*

$$PDF_{TOT}(i,n) = PDF_{ISI}(i,n) * PDF_{SSO,XTALK}(i,n)$$

SIMULATING THE TRANSMISSION AND SIMULTANEOUS SWITCHING OUTPUT NOISE OF SIGNALS IN A COMPUTER SYSTEM

PRIORITY APPLICATION

This application is a continuation of U.S. application Ser. No. 12/838,120, filed Jul. 16, 2010, which is incorporated herein by reference in its entirety.

CROSS REFERENCE TO RELATED APPLICATIONS

This application is concurrently filed with another patent application entitled "Simulating the Transmission of Asymmetric Signals in a Computer System," by the same inventor (hereinafter "concurrent application"), which is incorporated herein by reference in its entirety.

FIELD OF THE INVENTION

This invention relates to improved methods for simulating the transmission of signals in a computer system.

BACKGROUND

Circuit designers of multi-Gigabit systems face a number of challenges as advances in technology mandate increased performance in high-speed components. At a basic level, data transmission between high-speed components within a single semiconductor device or between two devices on a printed circuit board may be represented by the system 10 shown in FIG. 1. In FIG. 1, a transmitter 12 at a transmitting device 8 (e.g., a microprocessor) sends data over a transmission channel 14 (e.g., a copper trace on a printed circuit board or "on-chip" in a semiconductor device) to a receiver 16 at a receiving device 9 (e.g., another processor or memory). When data is sent from an ideal transmitter 12 to a receiver 16 across an ideal (lossless) channel, all of the energy in a transmitted pulse will be contained within a single time cell called a unit interval (UI).

However, real transmitters and real transmission channels do not exhibit ideal characteristics, and the effects of transmission channels are becoming increasingly important in high-speed circuit design. Due to a number of factors, including, for example, the limited conductivity of copper traces, the dielectric medium of the printed circuit board (PCB), and the discontinuities introduced by vias, the initially well-defined digital pulse will tend to spread or disperse as it passes along the channel 14. This is shown in FIG. 2. As shown, a single ideal positive pulse 20 is sent by the transmitter 12 during a given UI (e.g., $UI_0$). However, because of the effect of the channel 14, this data pulse 20 becomes spread 21 over multiple UIs at the receiver 16, i.e., some portion of the energy of the pulse is observed outside of the UI in which the pulse was sent (e.g., in $UI_{-1}$ and $UI_1$). This residual energy outside of the UI of interest may perturb a pulse otherwise occupying either of the neighboring UIs in a phenomenon referred to as intersymbol interference (ISI).

Due to several factors associated with the complexity in designing, building, and testing such circuitry, it is a common practice in the art of integrated circuit design to simulate the operation of a circuit using a computer system. Simulation software allows the circuit designer to verify the operation and margins of a circuit design before incurring the expense of actually building and testing the circuit. Simulation is particularly important in the semiconductor industry, where it is generally very expensive to design and produce a given integrated circuit. Through the use of simulations, design errors or risks are hopefully identified early in the design process, and resolved prior to fabrication of the integrated circuit.

The challenge associated with simulating channel-affected signals is highly correlated to the characteristics of the degradation imposed by the transmission channel, and so simulation has focused on the effect that the channel has on transmitted signals. One such approach was discussed in B. Casper et al., "An Accurate and Efficient Analysis Method for Multi-Gb/s Chip-to-Chip Signaling Schemes," 2002 Symposium on VLSI Circuits Digest of Technical Papers, pp. 54-57 (2002), which is submitted in the Information Disclosure statement accompanying the filing of this disclosure, and which technique is summarized in FIGS. 3A-3E.

Casper's technique assumes a particular transfer function, $H(s)_{chan}$, for the channel 14, which transfer function models the capacitance, resistance, and other parameters of the channel. By entering such transfer function information and other modeling information into a computer system, as is typical, the effects of the channel 14 on an idealized positive pulse 20 are simulated, resulting in a positive pulse response 21, similar to FIG. 2. The ideal positive pulse has a magnitude of Va, which would comprise the ideal magnitude of the logic '1' data bits transmitted along the channel 14 being simulated, with ideal logic '0' bits comprising zero Volts. The actual value of Va would depend on the system being modeled but is assumed to be one Volt for simplicity and as representative of the logic levels in current transmission systems. An example positive pulse response 21 is seen in further detail in FIG. 3A, and is described as a function X. As was the case in FIG. 2, the majority of the energy of the distorted positive pulse 21 occurs in $UI_0$, which corresponds to the UI of the ideal positive pulse 20, and which may be referred to as the cursor UI for short. Some energy also occurs before $UI_0$, e.g., in unit intervals $UL_{-1}$ and $UL_{-2}$, which may be referred to as pre-cursor UIs. Likewise, some energy occurs after $UI_0$, e.g., in unit intervals $UI_1$ and $UI_2$, which may be referred to as post-cursor UIs.

The positive pulse response 21, X, may be described as a series of discrete points, each referenced to a particular time 'i' in the unit intervals. Index 'i' is shown in FIG. 3A such that the points are roughly in the middle of each UI, but this is merely illustrative. These points may be modeled as a series of delta functions X(i) occurring at each of the 'j' UIs, as shown in the equation at the top of FIG. 3A, with each delta function δ(j) being scaled by the magnitude of the positive pulse response 21 at that UI, i.e., $X(i)_j$. Such delta function scaling is commonly utilized in digital signal processing sampling theory. Viewed more simply, and as is more convenient for simulation in a computer system, the positive pulse response 21 may also be characterized as a vector containing each of the magnitude components (e.g., [ . . . $X(i)_{-2}$, $X(i)_{-1}$, $X(i)_0$, $X(i)_1$, $X(i)_2$ . . . ] or [ . . . −0.025, 0.15, 0.75, 0.2, −0.15 . . . ] to use the voltage values actually illustrated). How many magnitude terms are used, or how long the vector will be, is a matter of preference, but would logically incorporate the bulk of the positive pulse response 21. More terms will improve the accuracy of the analysis to follow, but will require additional computing resources.

Also shown in FIG. 3A is a zero response 22, Z, which characterizes the transmission of a logical '0' across the channel. As can be seen, this zero response 22 assumes that the channel 14 has no effect, and as such the resulting magnitude values $Z(i)_j$ are all set to zero. Although seemingly uninteresting, the zero response 22 is used in Casper's technique along with the positive pulse response 21 to generate statistics regarding receipt of data at the receiver 16, as will be seen below.

From the positive pulse response 21 and the zero response 22, i.e., from vectors X(i) and Z(i), Casper's technique derives a probability distribution function ($PDF_{ISI}$) at time 'i' as shown in FIGS. 3B and 3C, which $PDF_{ISI}$(i) is meant to simulate where the receiver 16 could statistically expect to see signal voltage values occurring at the end of the channel 14. Because Casper's technique captures ISI, and because the spread of the PDFs derived using his technique result from ISI, the PDFs are labeled as $PDF_{ISI}$(i).

Casper's technique uses convolution to derive the $PDF_{ISI}$(i), as illustrated in some detail in FIG. 3B, and more specifically involves a recursive convolution of various pairs of corresponding terms $X(i)_j$ and $Z(i)_j$ in the positive pulse response 21 and the zero response 22. Take for example the terms corresponding to the cursor UI $X(i)_0$ and $Z(i)_0$. Because these terms both occur within the same UI, $UI_0$, they are written in FIG. 3B as a pair ($X(i)_0$, $Z(i)_0$) or (0.75, 0) to use the actual illustrated values. This pair recognizes that the receiver could expect to see a value of 0.75 if a logic '1' was transmitted, or a value of zero if a logic '0' was transmitted, and assumes in a random data stream that reception of either of these values are equally probable. Thus, this pair can be represented as a PDF having two delta functions, one each at values 0.75 and 0, and each having a magnitude of 0.5 (50%). Likewise, and working with the pre-cursor interval pairs first, the next pair ($X(i)_{-1}$,$Z(i)_{-1}$) or (0.15, 0) can also be represented as a PDF having two delta functions. These two pairs can then be convolved as shown, resulting in yet another PDF illustrating the now four possibilities for the received voltages (0, 0.15, 0.75, and 0.9), each with a probability of 0.25 (25%). Convolution (represented herein using an asterisk symbol '*') is a well-known mathematical technique for cross-correlating two functions, and is assumed familiar to the reader. Convolution is a linear operation, and therefore relies on the mathematical assumption that the system under analysis is linear, time-invariant (LTI), a well-known and common assumption. Introduction of system nonlinearities introduces errors during the calculation process. It should be understood that the PDF resulting from the convolution is appropriately scaled to achieve a sum total probability of 1, although such scaling is not shown in the formulas in the Figures.

This resulting PDF can then be convolved with a third pair of terms ($X(i)_{-2}$, $Z(i)_{-2}$) or (−0.025, 0), resulting in a new PDF with eight values, each with probabilities of 0.125 (12.5%), and so on until all of the pre-cursor pairs have been convolved. Thereafter, and as shown in the formula in FIG. 3B, the post-cursor pairs are similarly recursively convolved, until all pairs of interest have been treated. (It bears noting here that convolution is commutative, and therefore it does not matter in which order the various pairs are convolved). Eventually, when all of the pairs of terms have been recursively convolved, the result is a final $PDF_{ISI}$ at time 'i,' as illustrated in FIG. 3C. Because an actual $PDF_{ISI}$, as calculated this way in a computer system will likely have discrete values, curve fitting can be used to arrive at a $PDF_{ISI}$ which is smooth, as shown in FIG. 3C. As would be expected, the resulting $PDF_{ISI}$ is bi-modal, comprising two lobes corresponding to the received voltages for the transmission of a logic '1' and/or '0' across the channel 14, which again are assumed to be transmitted with equal probabilities, such that each lobe encompasses an area of 0.5 (50%). Although the $PDF_{ISI}$ lobes, as illustrated in FIG. 3C, appear Gaussian, the actual resulting shape will depend on the particulars of the channel 14 being simulated.

Once the $PDF_{ISI}$ is determined for a particular time 'i', 'i' can be changed, allowing for new terms X(i) and Z(i) to be determined from responses 21 and 22, and for a new $PDF_{ISI}$ to be determined. The cumulative effect is illustrated in FIG. 3D, which shows the PDFs as determined for different values of 'i' across the cursor UI. As would be expected, the lobes of the PDFs are sharper and better separated near the center of the UI, signifying that the resolution at the receiver 16 between logic '1' and '0' is statistically easier in such areas. Toward the edges of the UI, the lobes are closer and broader, indicating that the resolution at the receiver 16 between logic '1' and '0' is statistically more difficult in such areas.

These PDFs in sum allow the reliability with which data is received at the receiver 16 to be analyzed. Such data also allows sensing margins 25 to be set, and bit error rates to be deduced. For example, on the basis of the PDFs illustrated in FIG. 3D, it may be decided that the receiver 16 should sample received data anywhere between $t_1$=45 ps to $t_2$=55 ps within the UI, and use a reference voltage between $Vref_1$=0.34 and $Vref_2$=0.41V to discern between logic '0's and '1's, because the statistics of the PDFs indicate an acceptable bit error rate (e.g., no more than 1 error in $10^{12}$ bits) within these margins 25. As such, Casper's technique is similar in nature to "eye diagrams" (FIG. 3E) also used to assess data reception reliability, and to set appropriate sensing margins. See, e.g., U.S. Patent Application Publication 2009/0110116, discussing eye diagrams in further detail. In an eye diagram, successive UIs of a simulated received signal (usually, a random bit stream) are overlaid to see where the signals occur, and where a clear "eye" exists within the margins. To generate an eye diagram, the designer must simulate the data transmission over thousands-to-millions of cycles to arrive at statistically significant bit error rates. Casper's technique, by contrast, doesn't require randomizing the input data, and thus provides a simpler method to, in effect, generate an "eye" to characterize a channel without the need for simulation of an actual randomized bit stream of data. Instead, only simulation of the transmission of a single ideal positive pulse 21, and analysis of the resulting positive pulse response 21, is needed.

Still, the inventor has realized that Casper's technique suffers certain shortcomings, and can be improved. Such improvements are discussed herein.

BRIEF DESCRIPTION OF THE DRAWINGS

FIG. 5 illustrates one embodiment of the disclosed technique, comprising a calculation for determining a probability distribution function $PDF_{TOT}$ comprised of the convolution of PDF terms quantifying Intersymbol Interference (ISI), cross talk between different channels, and Simultaneous Switching Output (SSO) noise.

FIGS. 7A-7H illustrate techniques for determining a PDF indicative of the effect of cross talk on data transmission, $PDF_{XTALK}$.

FIGS. 11A-11F illustrate different mathematical formulas for $PDF_{TOT}$ useful in different circumstances.

DETAILED DESCRIPTION

Figure 1:
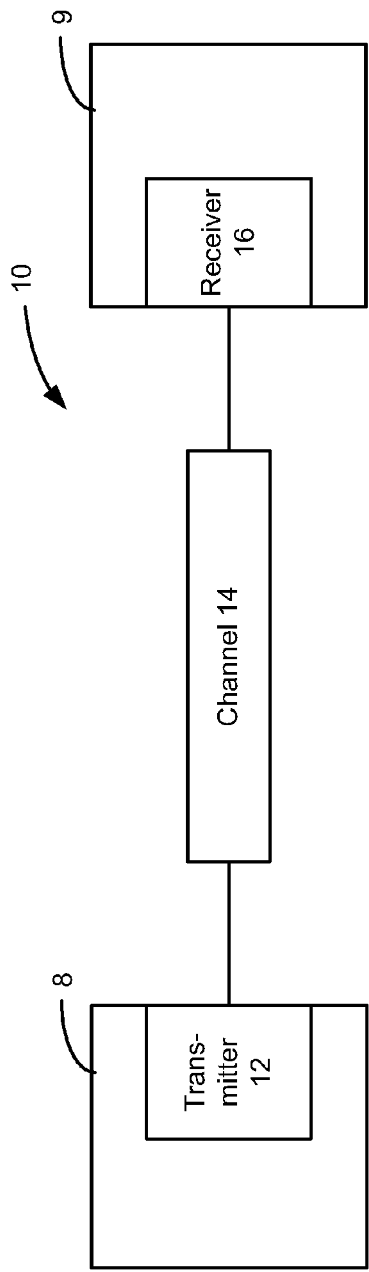
FIG. 1 illustrates a block diagram of a transmission system having a channel.
Figure 2:
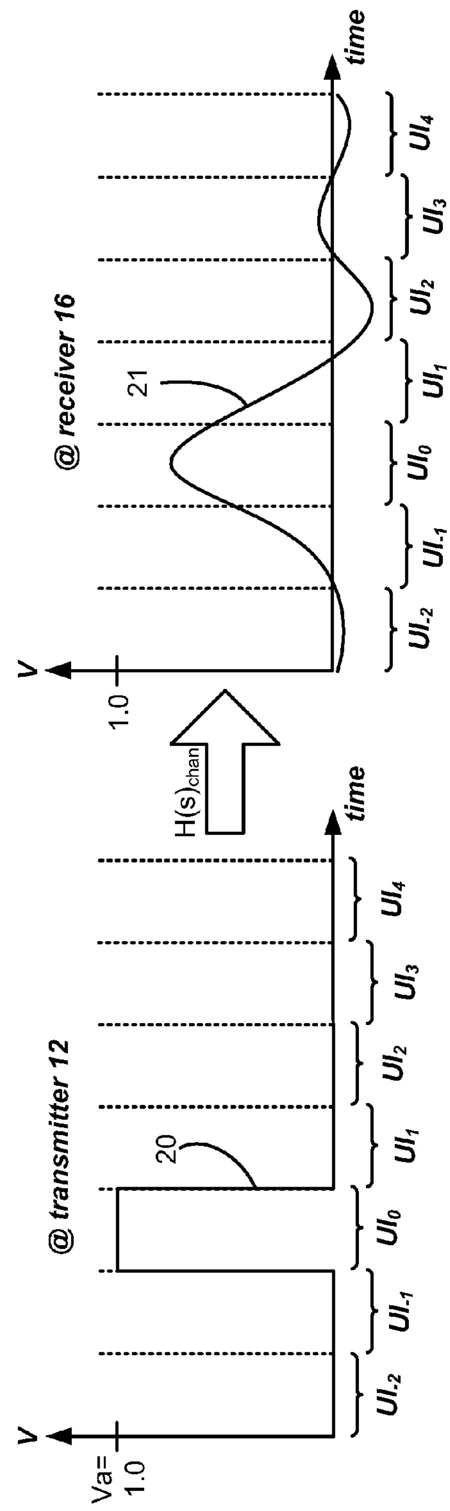
FIG. 2 illustrates the effect of a channel on an ideal positive pulse transmitted across the channel.
Figure 4:
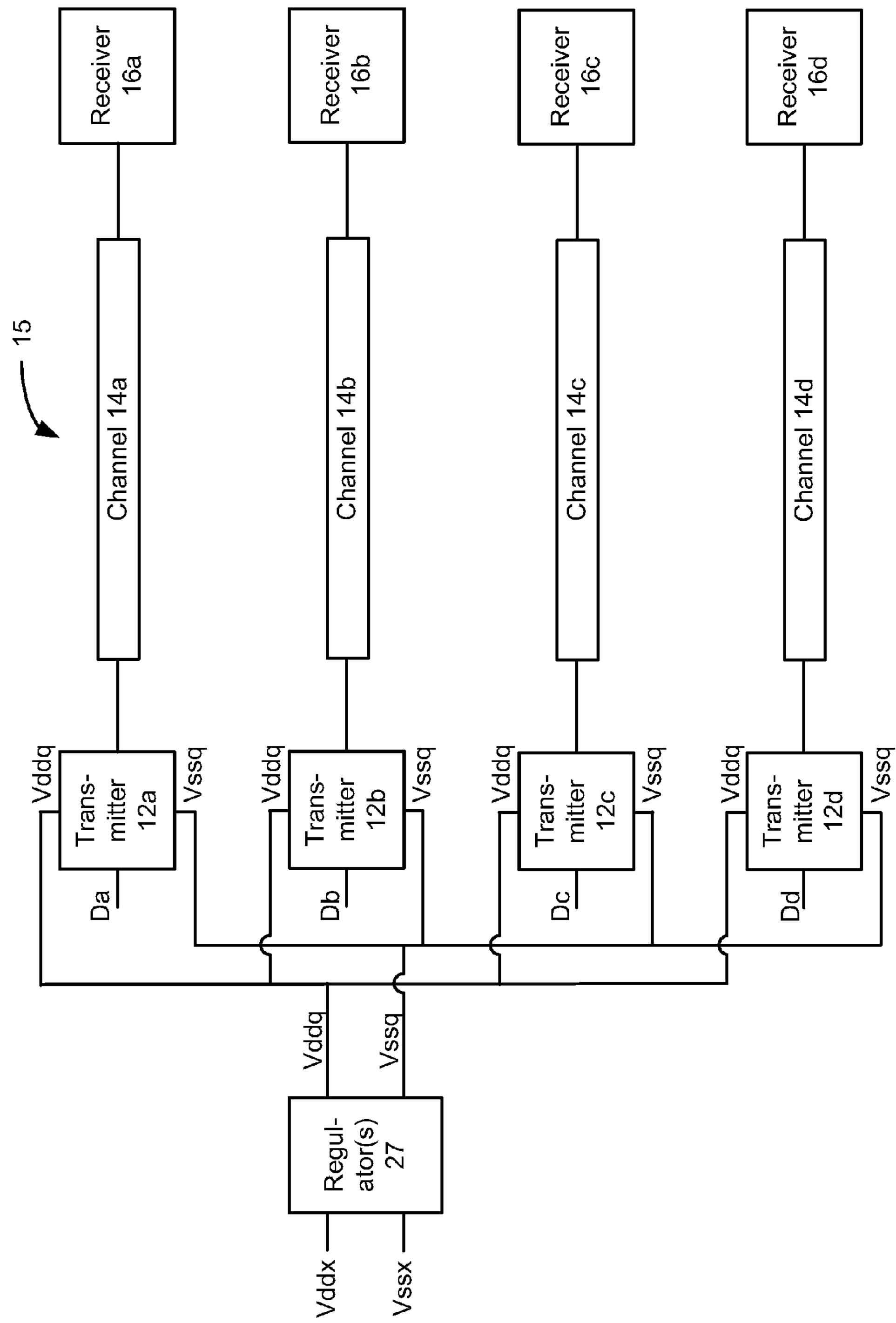
FIG. 4 illustrates a multi-channel communication system, including transmitters and power circuitry for providing power supply voltages to the transmitters.

The inventor has noticed that Casper's technique does not address certain phenomenon involved in the transmission of signals down a realistic data bus, and that such failure hampers the utility of the PDFs resulting from his technique. An example data bus 15 is shown in FIG. 4, and comprises a plurality of channels 14*a*-14*d* upon which data will be transmitted in parallel. Only four channels are shown, but one skilled will understand that a realistic bus 15 will often contain 8, 16, 32, or even greater numbers of signals. Also shown are the various transmitters 12*a*-12*d* for driving data Da-Dd onto the corresponding channels 14*a*-14*d*. As shown, each of the transmitters 12 is powered by two power supply voltages, Vddq and Vssq. Such power supply voltages are typically set to the desired ideal voltage values of the logic states to be transmitted along the channel, such that Vddq equals a logic '1' (e.g., 1.2V) and Vssq equals a logic '0' (e.g., 0V or ground). Because it is desirable to isolate power supply voltages Vddq and Vssq from other power supply voltages used internal to the transmitting device 8 (FIG. 1), Vddq and Vssq are often generated by a regulator circuitry 27, which circuitry may actually comprise a different regulator for the generation of each of the power supply voltages. Regulation circuit 27 may reside on the same integrated circuit as the transmitters 12*a*-12*d*, or may be supplied externally at a higher system level. Because the various transmitters 12*a*-12*d* share power supply voltages, noise coupled to the supply voltages by any one of the transmitters 12 can affect the others, which then affects the reliability of data transfer. One particular common problem with this type of power supply sharing is Simultaneous Switching Output (SSO) noise. SSO noise occurs when the transmitters 12 switch between logic states, and is particularly pronounced when a large number of the transmitters 12 simultaneously switch from one logic state to another. For example, suppose the transmitters 12*a*-12*d* have just transmitted logic '0's and are now set to transmit logic '1's, i.e., from <0000> to <1111>. Simultaneously requiring all of the transmitters 12*a*-12*d* to now pull their outputs from Vssq to Vddq can load the Vddq power supply, causing it to dip, such that the logic '1' data states will not be transmitted at ideally high voltage values. The same degradation is noticed on the Vssq power supply if a large number of transmitters must simultaneously switch from a logic '1' to a logic '0'. In high frequency signaling, transmitting non-ideal voltage levels translates into signal timing variations, which is of particular concern given the relatively short unit intervals involved.

Despite the reality of SSO noise and its impact on the reliability of data reception at the receivers 16*a*-16*d*, Casper's technique does not address such noise. As a result, the PDFs derived using Casper's technique, and ultimately bit error rates gleaned from them, would be overly optimistic. The disclosed techniques by contrast address and model SSO, as well as other non-idealities appearing in realistic transmission systems, such as cross talk between the various channels. As such, the disclosed techniques arrive at PDFs that are more realistic, and which are therefore more useful in arriving at realistic bit error rates. Moreover, the disclosed techniques involve minimal computation and a relatively modest amount of circuit simulation.

FIG. 5 sets forth embodiments of the disclosed techniques, which arrive at at least one $PDF_{TOT}$ that takes into account ISI, cross talk, and SSO. Computationally, cross talk and SSO, like ISI in Casper's technique, can be modeled as PDFs ($PDF_{XTALK}$ and $PDF_{SSO}$) which are each convolved with the $PDF_{ISI}$. Additionally, because cross talk and SSO can differ on a given channel 'n', each of the PDF terms as well as the resulting $PDF_{TOT}$ can be indexed to a channel 'n', meaning that each channel on a given bus can be separately modeled to take into account its unique layout and environment relative to the other channels. As with Casper's technique, $PDF_{TOT}$ and its underlying terms $PDF_{ISI}$, $PDF_{XTALK}$, and $PDF_{SSO}$ are also indexed to a particular time 'i' in the unit interval, and can therefore be recalculated at different times 'i' to arrive at eye-diagram style information useful for the determination of bit error rates and sensing margins. Additionally, separate PDFs can be calculated indicative of the reception of logic '1' and '0' states as reflected in the subscripts used in the two top equations in FIG. 5, or not as reflected in the bottom equation. Such indexing and computation of separate $PDF_{TOT}$ for logic '1' and '0's is especially useful should there be concerns about asymmetry in the transmission of logic '1's and '0's, as discussed further below. While FIG. 5 illustrates basic equations by way of introduction, the disclosed technique is not limited to these exact equations, and other equations are discussed later in conjunction with FIG. 10. As noted earlier, convolution is commutative, and therefore it does not matter in which order the various terms in FIG. 5 are convolved. Generation of the $PDF_{ISI}$ terms is discussed in FIG. 6; $PDF_{XTALK}$ in FIG. 7; and $PDF_{SSO}$ in FIG. 8.

As just noted, FIGS. 6A through 6E illustrate generation of the $PDF_{ISI}$ terms. Such terms can be arrived at in different ways. For example, and jumping ahead to FIG. 6D, $PDF_{ISI}(i)$ can be calculated using Casper's technique, reflected in the top equation of FIG. 6D, which was explained in the Background section. By way of quick review, Casper's technique recursively convolve all pair terms (X(i), Z(i)) with all other pair terms, where X(i) comprises values from the positive pulse response 21, and Z(i) comprises zero values from the zero response 22.

However, Casper's $PDF_{ISI}$ is not indexed to a particular logic state, because Casper's calculation builds up two symmetric PDF lobes indicative of the reception of logic '1's and '0's using a single calculation. As pointed out in the above-referenced concurrent application, Casper's technique thus does not address asymmetry that may result from the transmission of logic '1' and '0's, which asymmetry may result from non-linearities in the pull-up and pull-down characteristics in the transmitter 12 for example. The concurrent application however does address this asymmetry, and thus provides a technique for calculating separate PDFs for each of the transmitted logic states '1' and '0', i.e., $PDF_{ISI}$ and $PDF_{ISI0}$, as reflected in the bottom equations in FIG. 6D. Because this technique is fully explained in the concurrent application and assumed familiar to the reader, it is only briefly explained here with reference to FIG. 6A-6C.

Figure 6A:
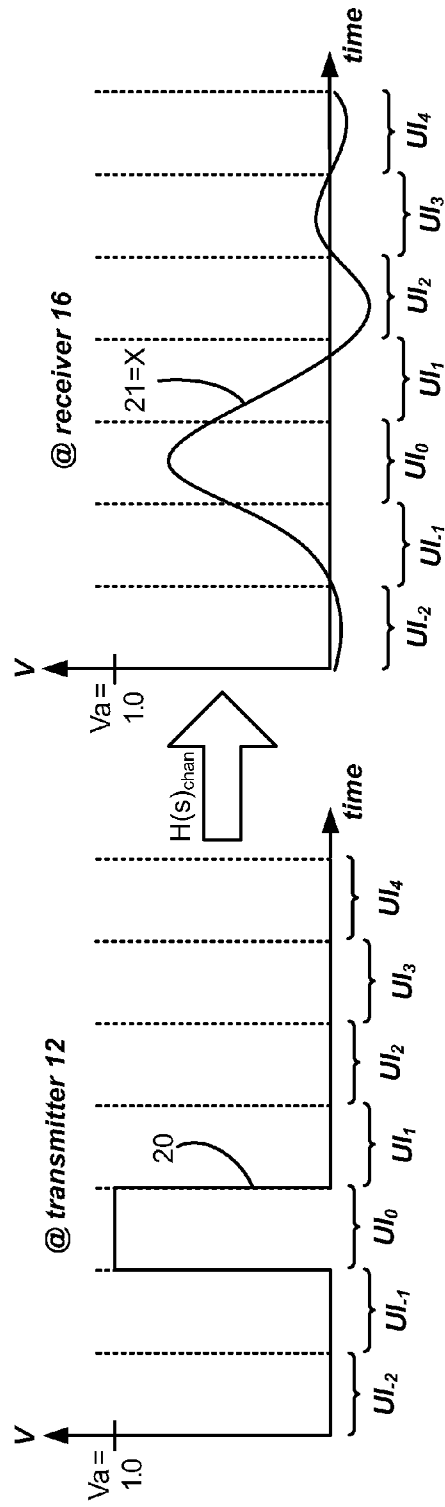
FIGS. 6A-6E illustrate techniques for determining a PDF indicative of the effect of ISI on data transmission, $PDF_{ISI}$.
Figure 6B:
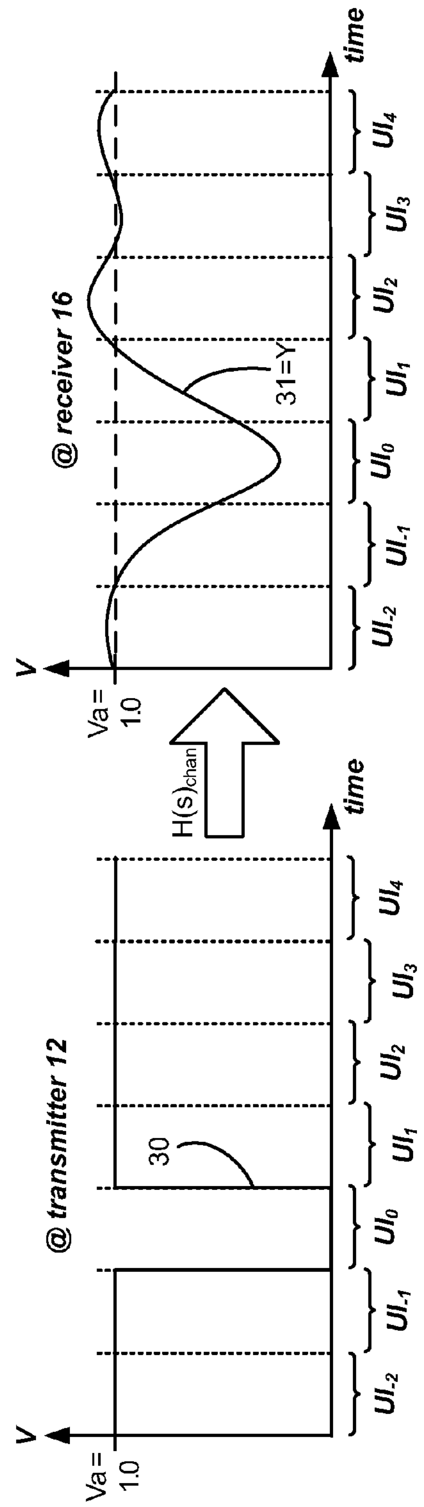
Figure 6C:
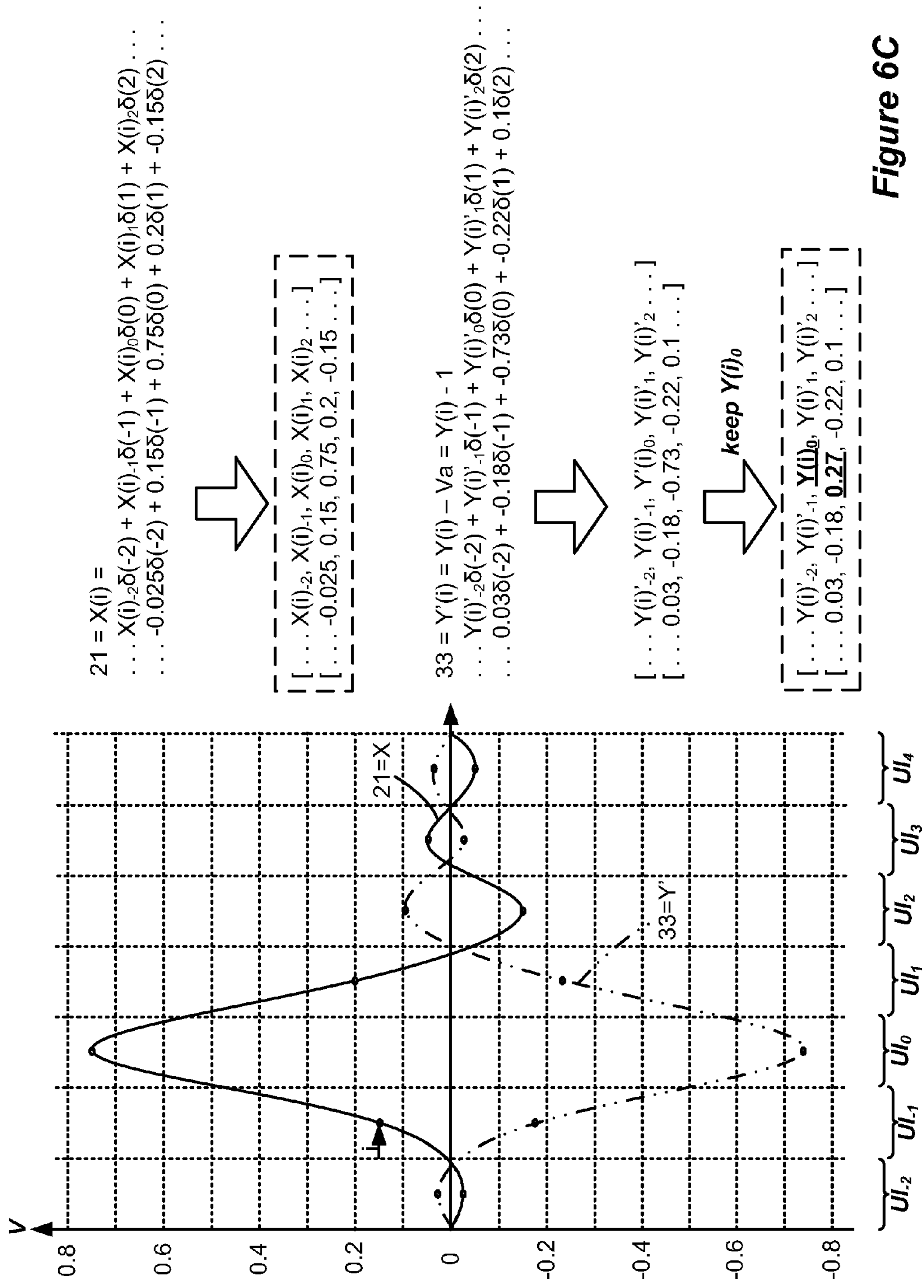

Referring to FIGS. 6A and 6B, the concurrent application not only derives a positive pulse response 21 X using an ideal positive pulse 20, it also derives a negative pulse response using an ideal negative pulse 30. As shown in FIG. 6C, the negative pulse response Y can be vertically shifted by the magnitude of the ideal pulses (Va), to arrive at a vertically-shifted negative pulse response, Y'. Using the values from the positive pulse response and the vertically-shifted negative pulse response (but retaining the original non-shifted cursor UI value $Y(i)_0$), the formulas at the bottom of FIG. 6D produced PDFs for received '1's ($PDF_{ISI1}$) and '0's ($PDF_{ISI0}$).

Figure 6D:
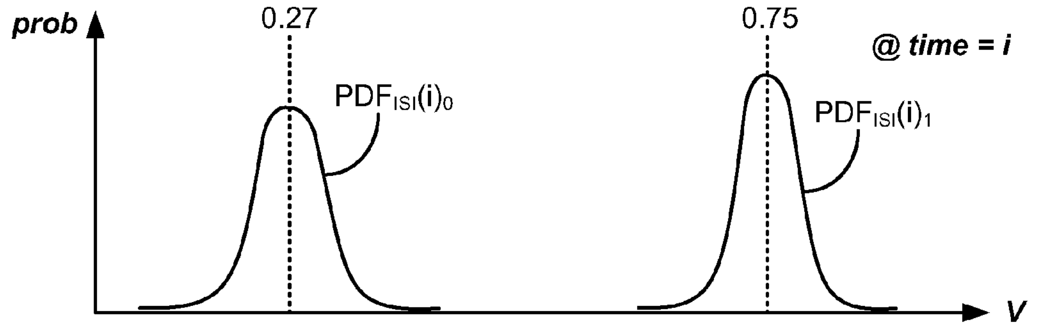

As shown in FIG. 6D, each of the $PDF_{ISI}$, whether uniquely calculated for logic states '1' and '0' or not, are shown indexed to a particular channel 'n' in the bus, which reflects that the positive (and/or negative) pulse response was simulated for a given channel 'n'. Such per-channel simulation can be useful if the channels in the bus or their associated transmitters are laid out differently, and thus might be more or less susceptible to ISI. However, if each of the channels are similar and can be expected to behave similarly from an ISI perspective, simulation of each channel 'n' may be unnecessary, and instead only a single $PDF_{ISI}$ (or $PDF_{ISI1}$ and $PDF_{ISI0}$) not indexed to any particular channel 'n' can be determined and used for all channels.

Figure 6E:
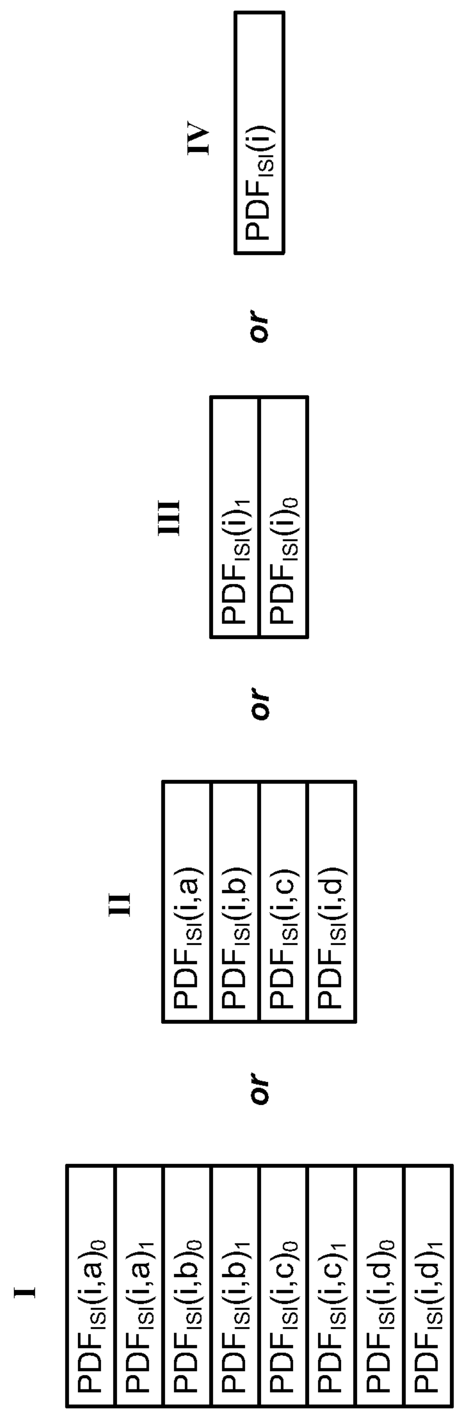

FIG. 6E summarizes the various $PDF_{ISI}$ terms that can be computed and used in the disclosed technique. If it is desired or indicated to compute $PDF_{ISI}$ for each of channels 14*a*-14*d* separately and for each logic state, the terms of Scenario I are used, which will require simulation of one or more pulses through each of the channels depending on whether Casper's technique or the technique of the concurrent application is used. If separate $PDF_{ISI}$ are desired for each channel, but one is not concerned about differences in the different logic states (e.g., because transmitter asymmetry is not a concern), then the terms in Scenario II can be used, which may require only simulating a single positive or negative pulse down each of the channels. Alternatively, the non-logic-state-indexed terms in Scenario II can be arrived at by convolving each of the logic states together for the channel (e.g. $PDF_{ISI}(i,a)=PDF_{ISI}(i,a)_0*PDF_{ISI}(i,a)_1$). If one is mainly concerned about differences in the PDFs resulting from differences in the logic states, but is not concerned with differences between the channels, the terms of Scenario III can be used. Here, only one channel need be simulated using one or more pulses through any given channel depending on whether Casper's technique or the technique of the concurrent application is used. Alternatively, the non-channel-indexed terms in Scenario III can be arrived at by convolving each of the channels together for a given logic state (e.g. $PDF_{ISI}(i)_1=PDF_{ISI}(i,a)_1*PDF_{ISI}(i,b)_1* \ldots$). This particular result leads to what is often referred to as the aggregate data eye, and in this instance is indicative of the ISI degradation seen when all of the data eyes from the various channels are overlaid. If one is not concerned with the differences between the channels or the logic states, the $PDF_{ISI}$ in Scenario IV can be used. Alternatively, the $PDF_{ISI}$ of Scenario IV can be arrived at from convolving all of the terms from Scenario I for example.

FIGS. 7 A-7H illustrate generation of the cross talk terms $PDF_{XTALK}$. Like the determination of $PDF_{ISI}$ in FIG. 6, $PDF_{XTALK}$ is derived using simulations resulting from a single ideal positive pulse 20 and/or ideal negative pulse through a transmitter 12 and its associated channel 14. For example, FIG. 7A shows the simulation of the transmission of an ideal positive pulse 20 and/or an ideal negative pulse 30 down channel 14*a*. Also shown between each of the channels 14 is a transfer function, H(s), indicative of the coupling between them. Each of the transfer functions H(s) captures the capacitive and inductance relationship between the channels, and are a function of the pitch between the traces, the dielectric environment between them, etc. The use of such transfer functions H(s) to model inter-channel behavior in a simulation is well known to those skilled in the art.

From the simulated pulse(s) on a given channel, and by application of the inter-channel transfer functions in the simulation software, cross talk pulse responses C are generated on all other channels. Assume for example that both a positive and negative pulse are simulated on channel 14*a*. This results in two cross talk pulse responses being generated on each of the other channels: $C(a,b)_1$ comprises the cross talk pulse response on channel 14*b* in response to the ideal positive pulse 20 (which is therefore indexed to logic state '1'), and $C(a,b)_0$ comprises the cross talk response on channel 14*b* in response to the ideal negative pulse 30 (which is therefore indexed to logic state '0'). Likewise, $C(a,c)_1$ and $C(a,c)_0$ are generated on channel 14*c* and $C(a,d)_1$ and $C(a,d)_0$ are generated on channel 14*d* in response to the pulses on channel 14*a*.

Figure 7A:
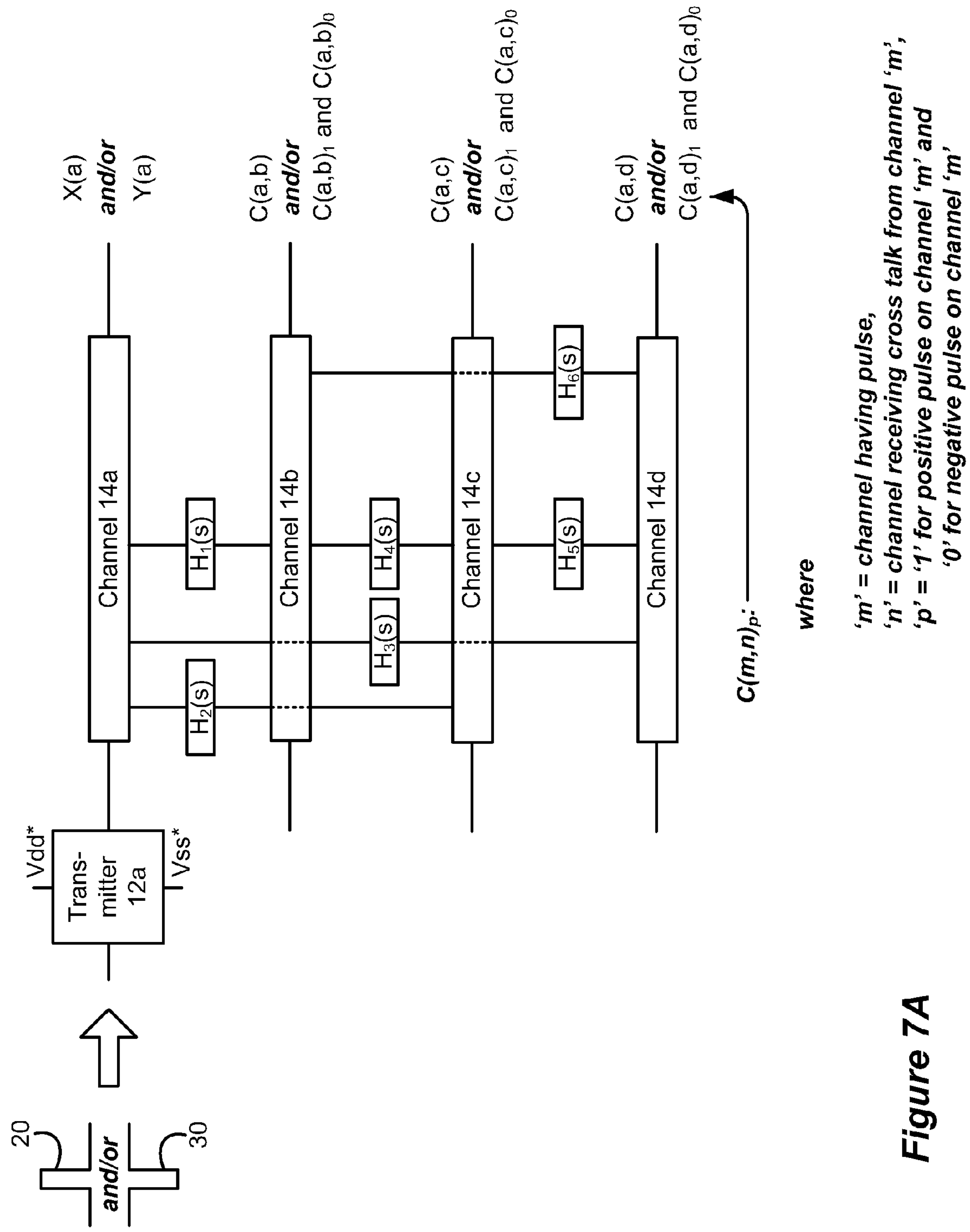

(Note that ideal pulses 20 and/or 30 can also be used to generate the positive and negative pulses responses X and Y used to generate $PDF_{ISI}$ (FIG. 6). Thus, as shown in FIG. 7A, the positive and/or negative pulse responses on channel 14*a* for example, X(a) and Y(a), can be used to generate $PDF_{ISI}(i,a)$ and/or $PDF_{ISI}(i,a)_1$ and $PDF_{ISI}(i,a)_0$ in FIG. 6D, as well as terms cross talk values C(a,j) and/or $C(a,j)_k$. In short, the simulations described in FIGS. 6 and 7 can be performed at the same time.

In the simulation of FIG. 7A, the transmitter 12 is assumed to be supplied with ideal, constant power supply voltages, Vdd* and Vss*, rather than the actual power supply voltages Vddq and Vssq supplied from the regulator(s) 27 (FIG. 4). This is because at this point in the technique one is only concerned with understanding cross talk (and also ISI if X(a) and Y(a) are also ascertained at this point).

A summary of the various cross talk pulse response terms that are generated is summarized in the table of FIG. 7B. The use of both pulses 20 and 30 is indicated if the particulars of the layout suggest that cross talk between the channels would depend on the transmitted logic state. If this is not a concern, then cross talk pulse responses can be generated in response to either a positive or negative pulse, resulting in a single pulse response on other channels not indexed to a particular logic state. This is shown in FIG. 7C, which shows for example the resulting cross talk responses C(a,b), C(a,c),and C(a,d,) in response to a positive pulse 20 on the various channels.

It may not be necessary to assess the generated cross talk responses C on all other channels. If the channels are laid out as shown in FIG. 7A for example, one might expect a pulse on a given channel (e.g., 14*b*) to produce a significant cross talk response C only on neighboring channels (e.g., 14*a* and 14*c*), but an insignificant response on all other channels (e.g., 14*d*). In such a case, some of the generated cross talk responses can be ignored, as is shown in FIG. 7D.

Figure 7E:
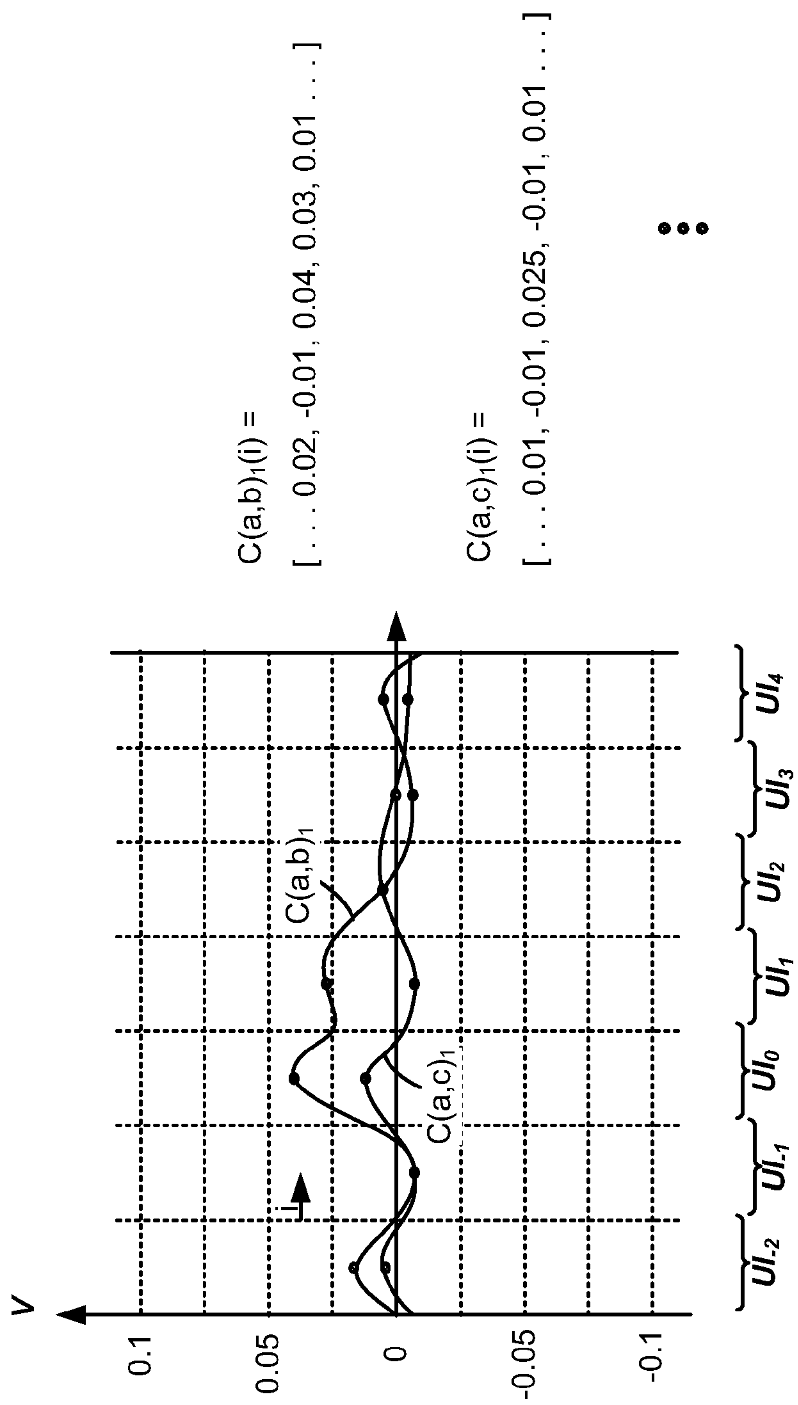

Two example cross talk pulse responses, $C(a,b)_1$ and $C(a,c,)_1$ generated in response to a positive pulse 20 on channel 14*a* are shown in FIG. 7E. As would be expected, higher levels of cross talk are seen in the cursor unit interval ($UI_0$) corresponding to the positive pulse. As may also be typical, note that the cross talk pulse response for neighboring channel 14*b* ($C(a,b)_1$) is generally larger than that shown for channel 14*c* ($C(a,c)_1$), which is farther away from, and hence not as strongly coupled to, channel 14*a*. In either case, the responses C comprise cross talk noise relative to ground, and thus vary around 0 Volts. As was the case with the positive and negative pulse responses X and Y, the cross talk pulse responses C can be represented as a vector of values indexed to a particular time 'i' in the unit interval.

Figure 3A:
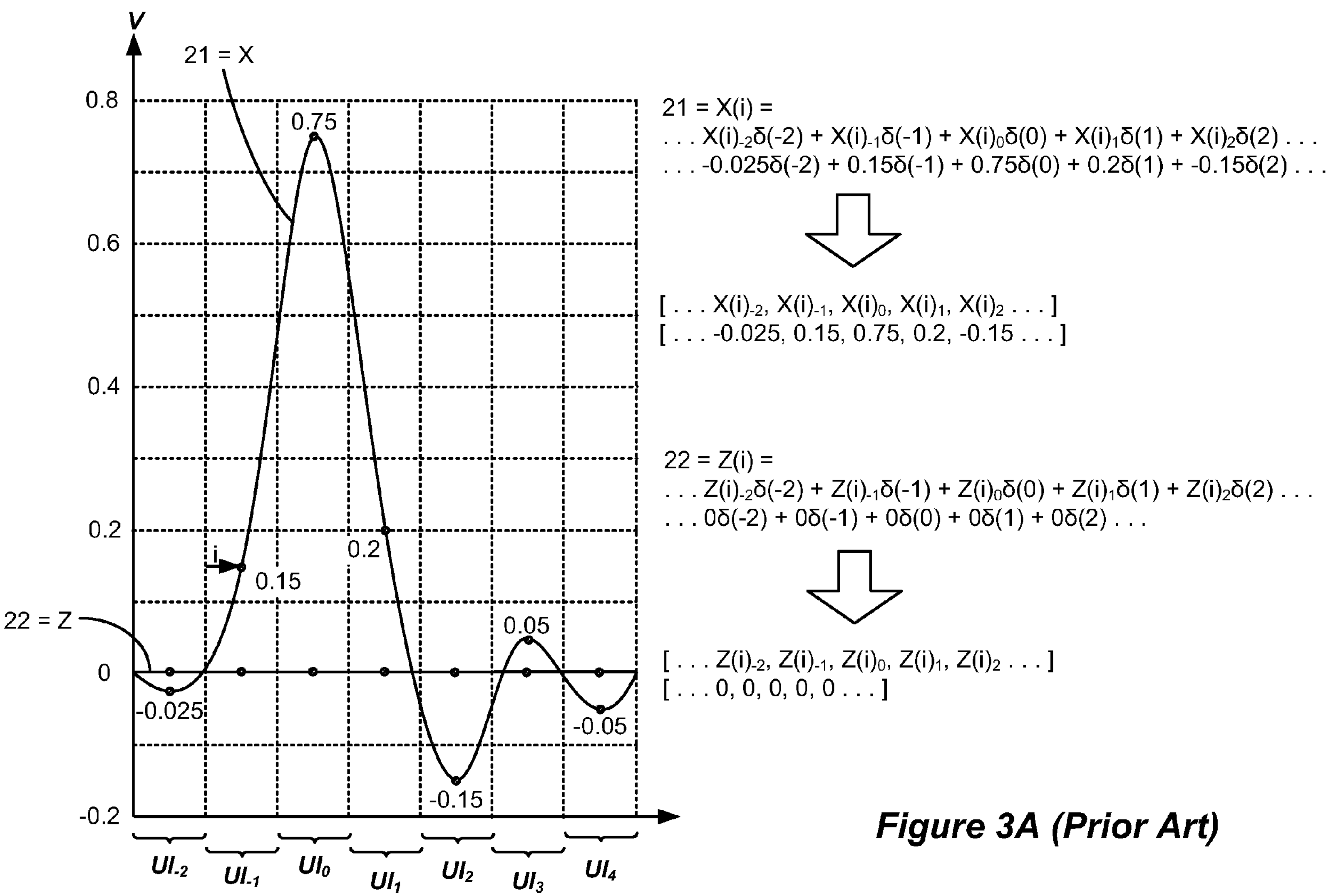
FIGS. 3A-3E illustrate a prior art technique for generating a probability distribution function (PDF) indicative of the statistics of reception of logic '0's and '1's at a receiver at the end of the channel.
Figure 3B:
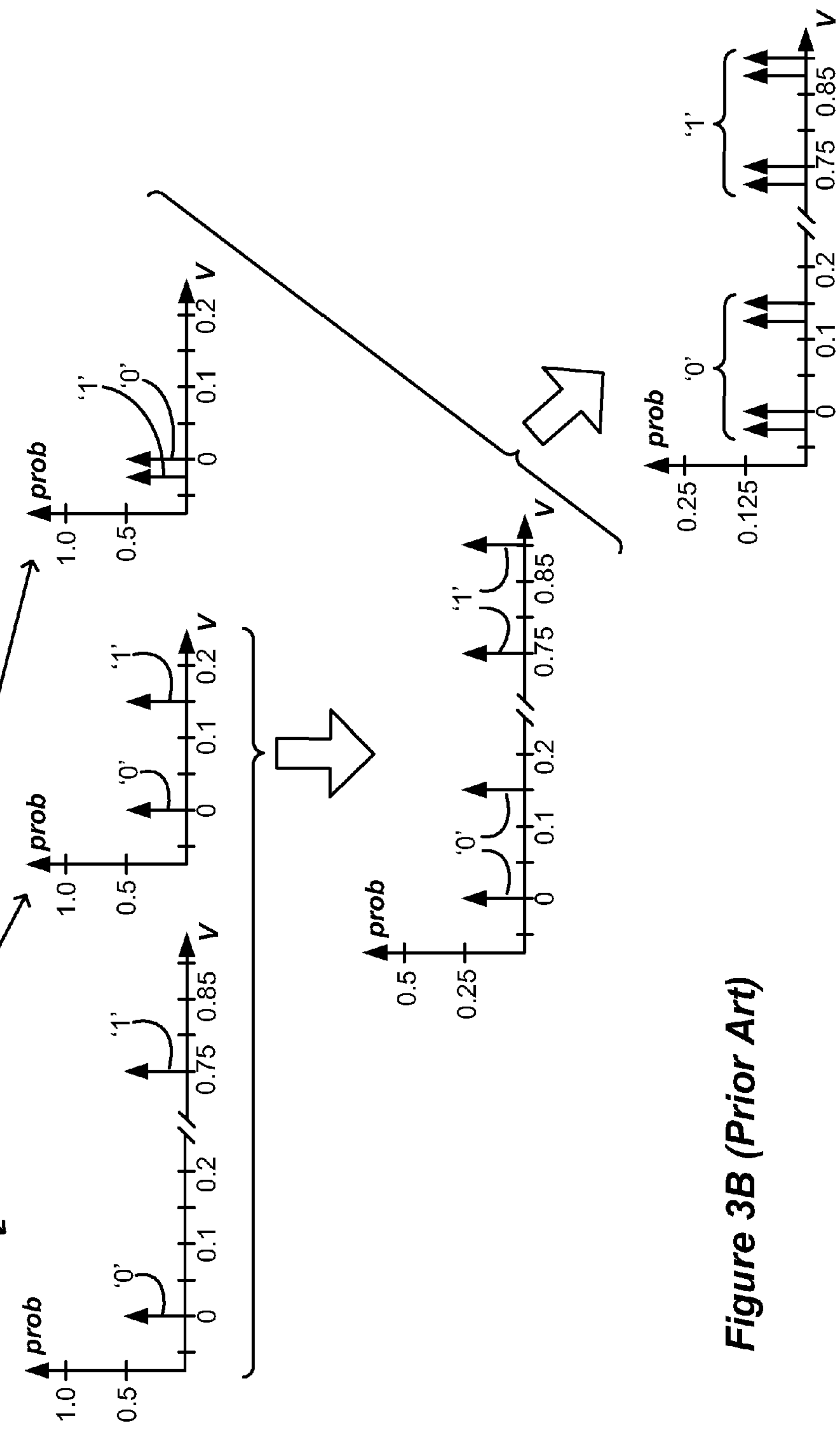
Figure 3C:
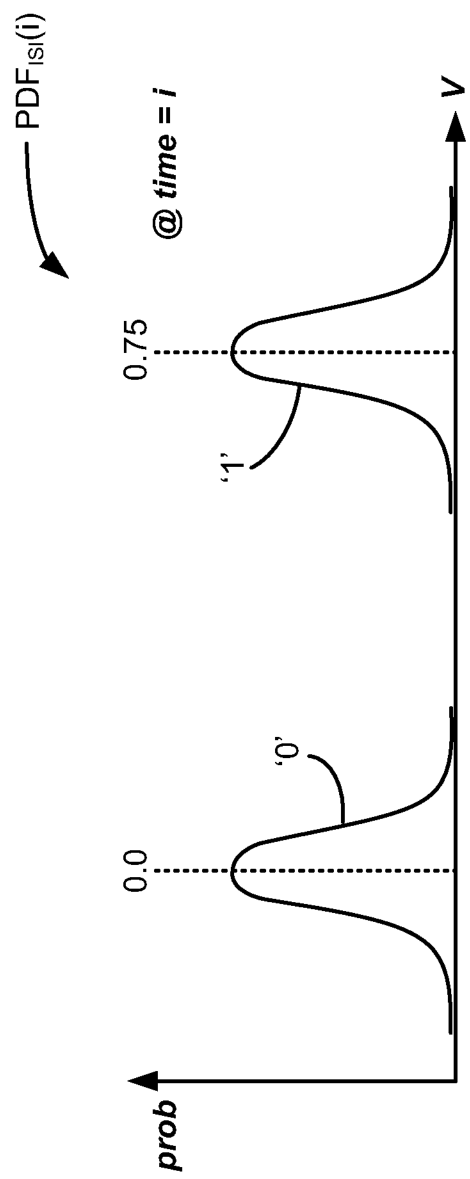
Figures 3D, 3E:
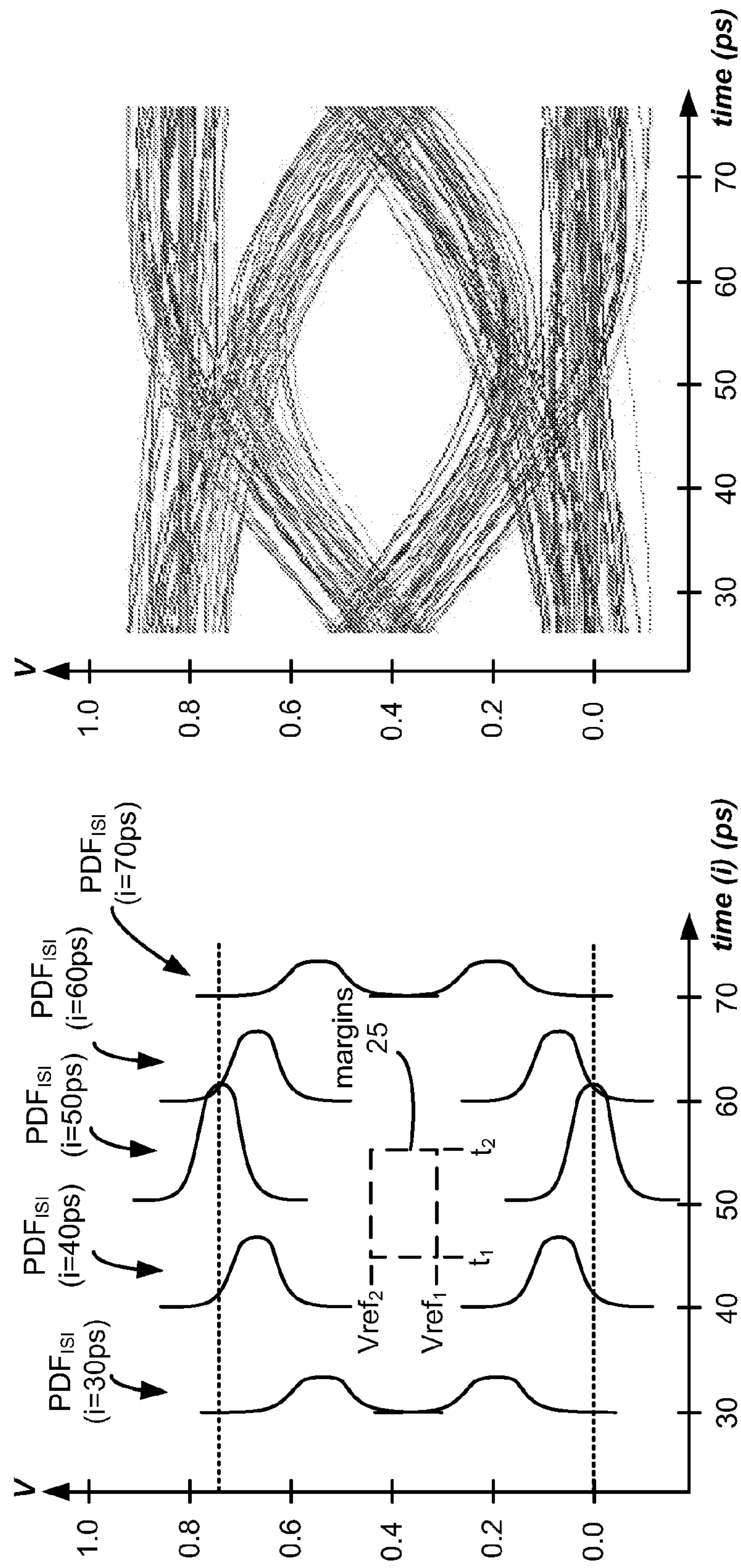
Figures 7F, 7G:
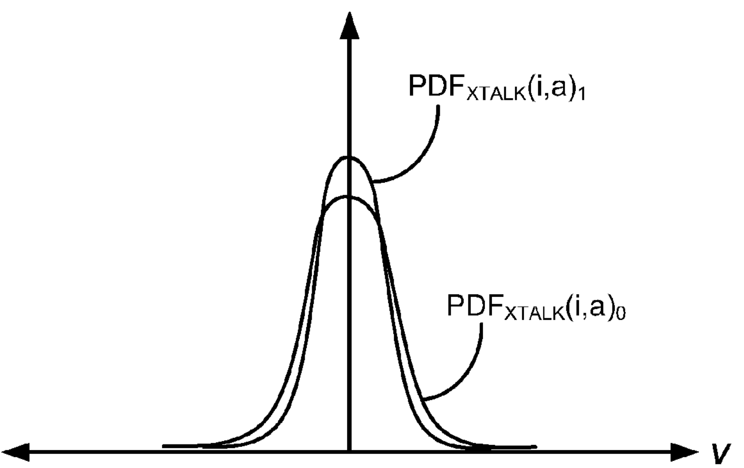

Using the vector values from the cross talk pulse responses, $PDF_{XTALK}$ can be generated as shown in FIG. 7F. $PDF_{XTALK}$ can be derived for a given channel 'n' by recursively convolving all of the cross talk vector values generated on all the other channels. Each of the cross talk vector values are paired with a zero value. For example, and assuming that a separate $PDF_{XTALK}$ is desired for each logic state, $PDF_{XTALK}(i,a)_1$—the PDF of the cross talk affected by a positive pulse on channel 14*a* at time 'i'—recursively convolves all UI cross talk response values of interest from channel 14*b*—$C(a,b,)_1$, or (0.02, 0)*(−0.01, 0)*(0.04, 0), etc.—with the same corresponding values from channel 14*c* if desired—$C(a,c)_1$, or (0.01, 0)*(−0.01, 0)*(0.025, 0), etc. This recursive convolution is similar to that discussed in FIG. 3B in reference to Casper's technique, and thus the details of such steps are not repeated here. As discussed with respect to FIG. 7D, the cross talk pulse response value need not be included for all channels, especially those farther away from channel 14*a* and having only minimal coupling thereto.

The resulting $PDF_{XTALK}$ (or $PDF_{XTALK1}$ and $PDF_{XTALK0}$ if indexing to logic states is desired) is shown in FIG. 7G, and amount to a spread relative to 0 Volts (although not necessarily centered at zero as shown). Note that $PDF_{XTALK}$ is indexed to a particular channel (channel 14*a* as shown), and thus similar PDFs would be generated for each other channel using the simulation just discussed.

Figure 7H:
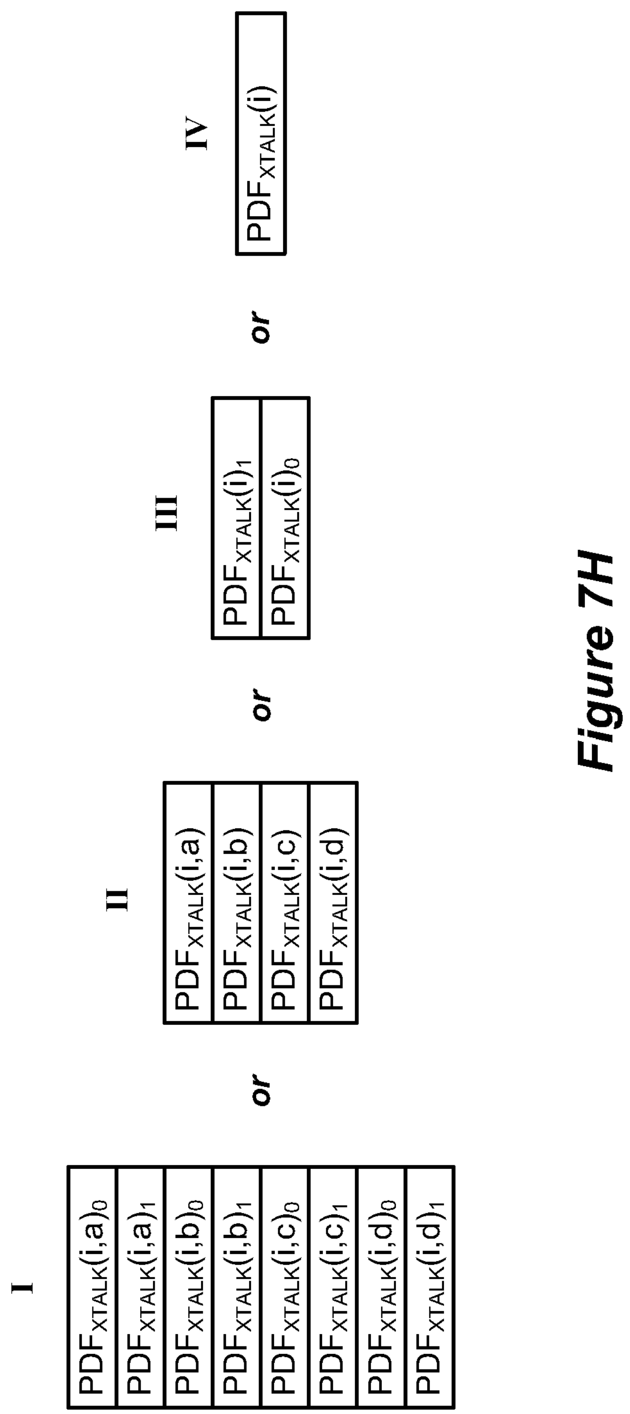

FIG. 7H summarizes the various $PDF_{XTALK}$ terms that can be computed and used in the disclosed technique. If it is desired or indicated to compute $PDF_{XTALK}$ for each of channels 14*a*-14*d* separately and for each logic state, the terms of Scenario I are used, which will require simulation of positive and negative pulses through each of the channels. If separate $PDF_{XTALK}$ are desired for each channel, but one is not concerned about differences in the different logic states, then the terms in Scenario II can be used, which require only simulating a single positive or negative pulse down each of the channels. Alternatively, the non-logic-state-indexed terms in Scenario II can be arrived at by convolving each of the logic states together for the channel (e.g. $PDF_{XTALK}(i,a)=PDF_{XTALK}(i,a)_0*PDF_{XTALK}(i,a)_1$). If one is mainly concerned about differences in the PDFs resulting from differences in the logic states, but is not concerned with differences between the channels, the terms of Scenario III can be used. Here, only one channel need be simulated using a positive and negative pulse. Alternatively, the non-channel-indexed terms in Scenario III can be arrived at by convolving each of the channels together for a given logic state (e.g. $PDF_{XTALK}(i)_1=PDF_{XTALK}(i,a)_1*PDF_{XTALK}(i,b)_1* \ldots$). If one is not concerned with the differences between the channels or the logic states, the $PDF_{XTALK}$ in Scenario IV can be used. Alternatively, the $PDF_{XTALK}$ of Scenario IV can be arrived at by convolving all of the terms from Scenario I for example.

FIGS. 8A-8E illustrate generation of $PDF_{SSO}$. Unlike previous steps, which involved simulation of at least one pulse (a positive and/or negative pulse), generation of $PDF_{SSO}$ involves simulation of a number of cycles, and ultimately the generation of an eye diagram, such as was discussed in the Background. Starting with FIG. 8A, a test pattern is input to a transmitter on a given channel, such as 14*a*. The test pattern preferably but not necessarily, comprises an alternating string of logic '1' and '0' bits (i.e., 101010 . . . ). This test pattern is preferred because it captures the sensitivity resulting from the asymmetry between the pull-up and pull-down characteristics of the transmitters. Additionally, a logic-state-balanced alternating test pattern does not introduce other effects, such as a general drifting upward or downward of the DC levels on the channels resulting from ISI, which phenomenon has already been addressed and captured elsewhere in the technique (see FIG. 6). However, other test patterns, or test signals more generally, could be used, including constant voltage test signals (e.g., power, ground, or tri-state), random test signals, etc.

The test pattern is input to a transmitter, which at this step of the process is supplied with ideal power supply voltage Vdd* and Vss*. In other words, the regulator(s) 27 (FIG. 4) and its associated distribution to the transmitter is not included in the simulation at this step. Moreover, the channel of interest is also decoupled from all other channels using the simulation software, and so it can be seen in FIG. 8A that transfer functions H(s) (FIG. 7A) are lacking between the channels. Such decoupling between the channels is desired to remove cross talk from the simulation. (Cross talk has already been quantized in FIG. 7, and it is therefore sensible to not once again include cross talk effects in the current determination of SSO).

Figure 8A:
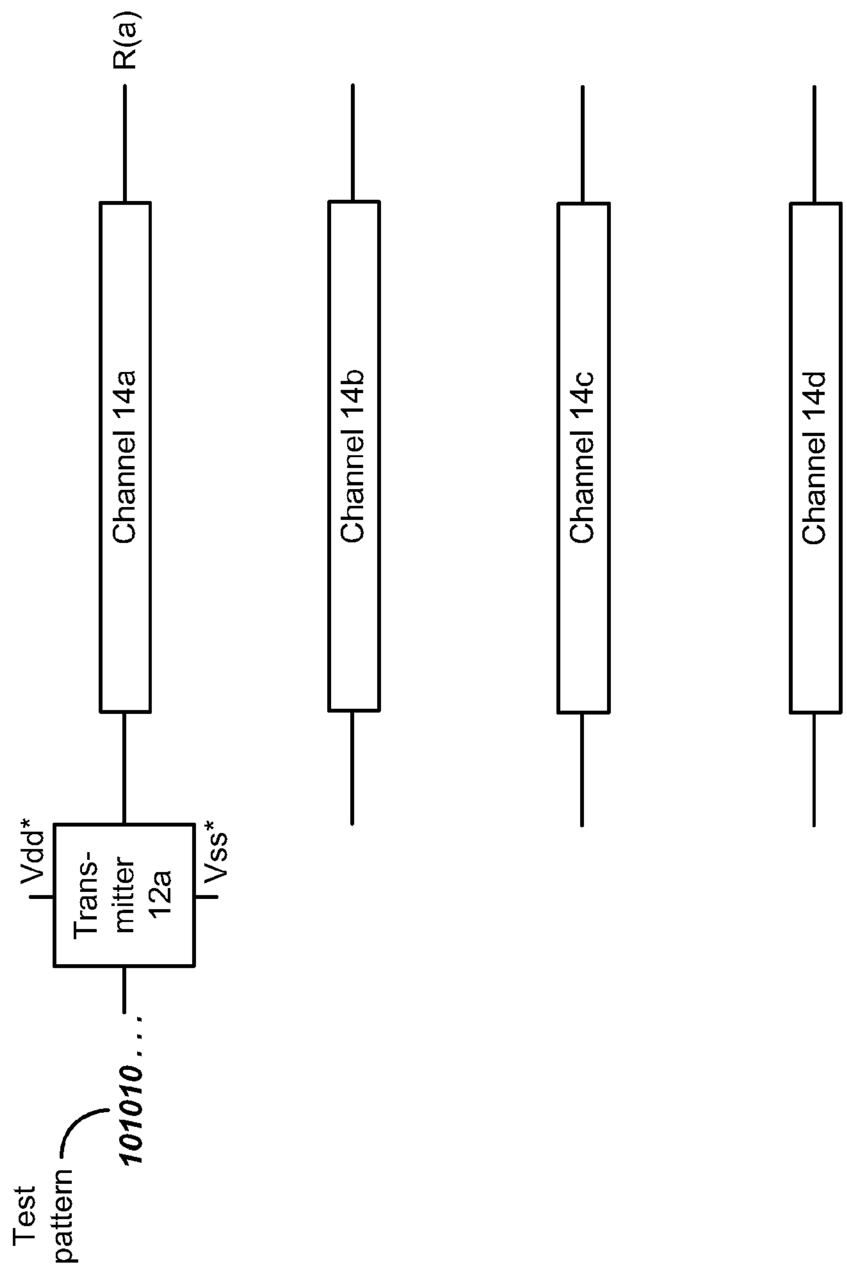
FIGS. 8A-8E illustrate techniques for determining a PDF indicative of the effect of SSO on data transmission, $PDF_{SSO}$.

The resulting waveform, R(a), is indexed to the channel, and comprises a baseline test pattern response. This baseline test pattern response R(a) is shown in FIG. 8C, in which the cycles of the response are overlaid as is typical in the formation of an eye diagram. Because cross talk has been removed from the simulation, and because the transmitter 12*a* is simulated with ideal, constant power supply voltages Vdd* and Vss*, the resulting baseline test pattern response, R(a), doesn't vary appreciably between the cycles, and thus comprises essentially solid lines with no deviation. Due to the transfer functions of the transmitter 12*a* and channel 14*a*, the baseline test pattern response is smoothed into a generally sinusoidal shape. When the cycles are overlaid as seen in FIG. 8C, the baseline test pattern response generally comprises a smooth upper portion indicative of receipt a logic '1', and bottom portion indicative of the receipt of a logic '0'. Each portion slopes at the beginning and end of the unit interval as affected by the preceding and subsequent opposite logic state forced by the alternating test pattern. Because the baseline test pattern response R(a) would be expected not to vary significantly, it can be determined using only a relatively limited number of cycles, which could comprise even a single cycle if initialization at the transmitter is ignored in the simulation.

The next step in the process is shown in FIG. 8B, which again involves the simulation of the same test pattern (101010 . . . ) over some number of cycles. However, in this simulation, ideal power supply voltages Vdd* and Vss* are not used at the transmitters 12, and indeed the entirety of the power distribution network is preferably included in the simulation. Thus, the transmitter power supplies, Vddq and Vssq, are allowed to vary and will depending on the switching of logic states at the transmitters. Additionally, all other data inputs other than the channel receiving the test pattern are supplied with a string of random logic values, RND(n). What results on the channel of interest is the test pattern as affected by SSO arising from the switching of the transmitters 12*a*-12*d* and potential loading of the power supply voltage Vddq and Vssq, and is referred to here as the SSO-randomized test pattern response, $R(a)_{SSO}$.

Figure 8B:
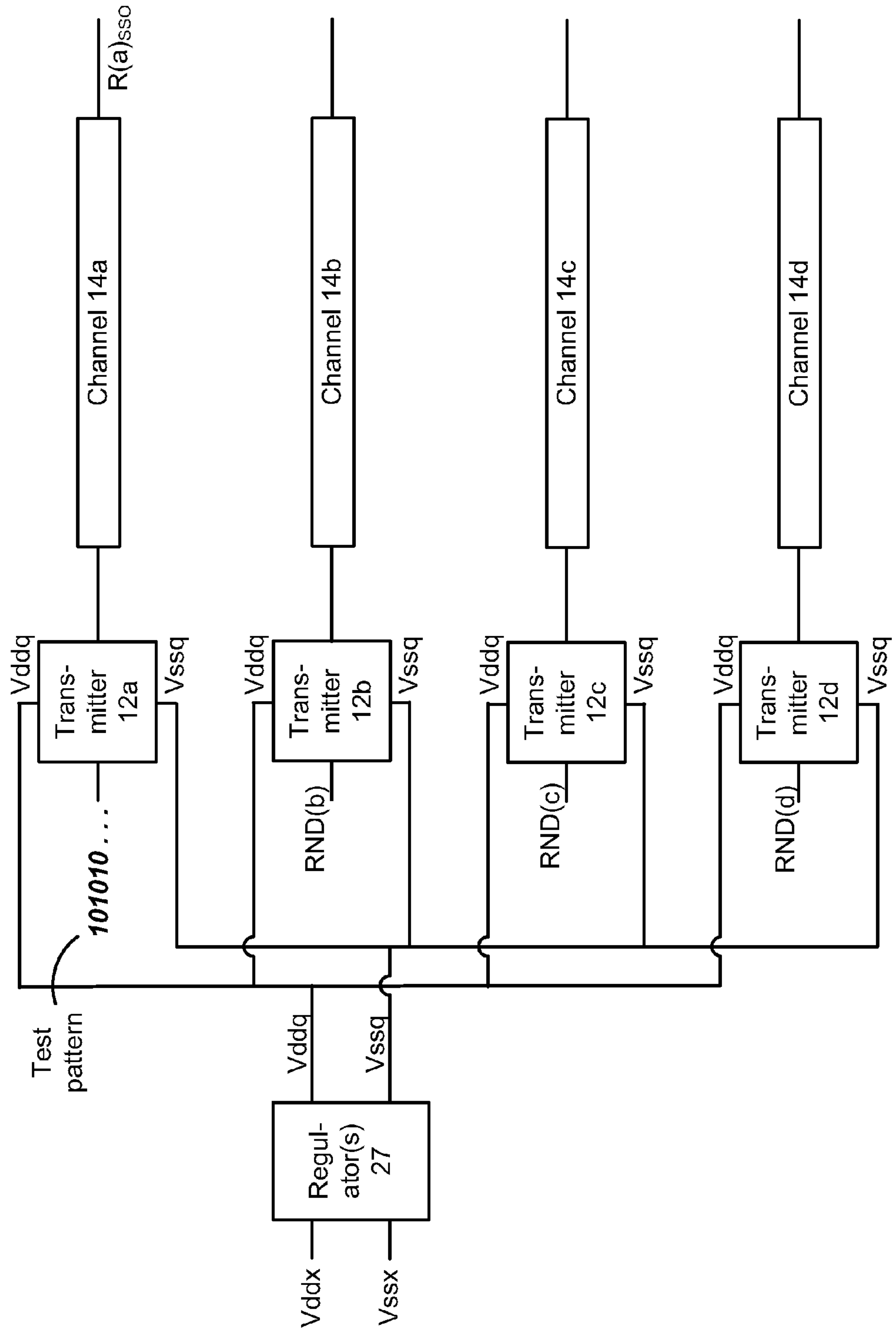
Figure 8C:
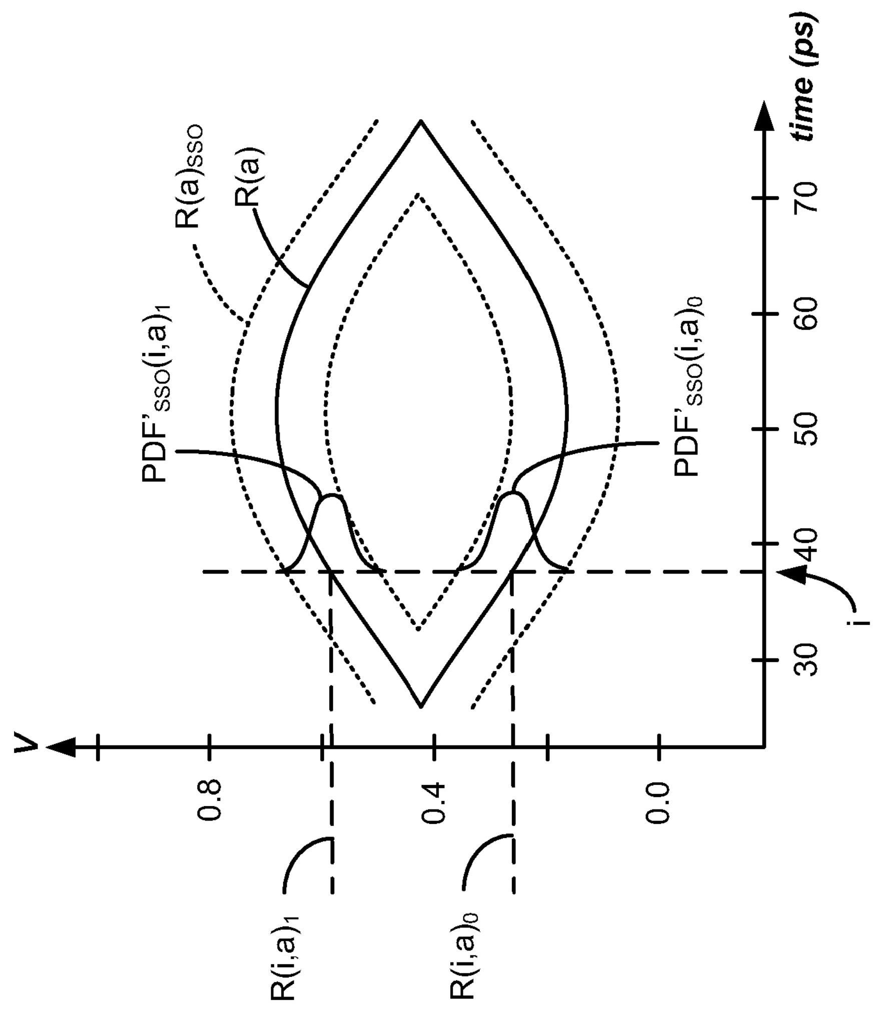

It is desired to run the SSO-randomized test pattern response ($R(a)_{SSO}$) simulation of FIG. 8B for a larger number of cycles when compared to the number of cycles needed to determine the baseline test pattern response (R(a)). This is because the intent of this latter simulation is to capture SSO, and in particular worse case SSO scenarios such as when all transmitters are switching from one logic state to another, as discussed earlier. To statistically ensure that such worst case scenarios are captured in the simulation, more than $2^n$ cycles, perhaps $100*2^n$ cycles, should be run, where 'n' equals the number of channels on the bus. While this step in the process may require many cycles to be simulated (perhaps 10,000 or so, depending on the bus width), such number of cycles would be far less than would be required to achieve statistically-significant bit error rates in the absence of the disclosed technique, which might otherwise require billions or trillions of cycles, and which is computationally difficult and time consuming.

The resulting cycles of the SSO-randomized test pattern response, $R(a)_{SSO}$, are seen in FIG. 8C overlaid in an eye diagram format. As would be expected, the SSO-randomized test pattern $R(a)_{SSO}$, has some spread relative to the baseline test response, R(a), due to the SSO imposed by the random inputs on the other channels. Note that $R(a)_{SSO}$ is compiled in the simulation program as a histogram of voltage values at any given time 'i' in the unit interval, with the number of entries in the histogram equaling the number of cycles in the simulation. As such, R(i,a)SSO amounts to a PDF as can be gleaned from the eye diagram that $R(a)_{SSO}$ represents. More specifically, $R(a)_{SSO}$ comprises two PDFs for the different logic states in the test pattern-$PDF'_{SSO}(i,a)_1$ and $PDF'_{SSO}(i,a)_0$. These PDFs comprise statistical deviations from the baseline values established by the base test response R(a) at that time 'i', i.e., $R(i,a)_1$ and $R(i,a)_0$. Because $PDF'_{SSO}(i,a)_x$ is derived from actual simulated waveforms, and is not derived by convolution as were the terms $PDF_{ISI}$ and $PDF_{XTALK}$ described earlier, it can be useful in subsequent steps to smooth, resample, or curve-fit this distribution in the computer system.

Figure 8D:
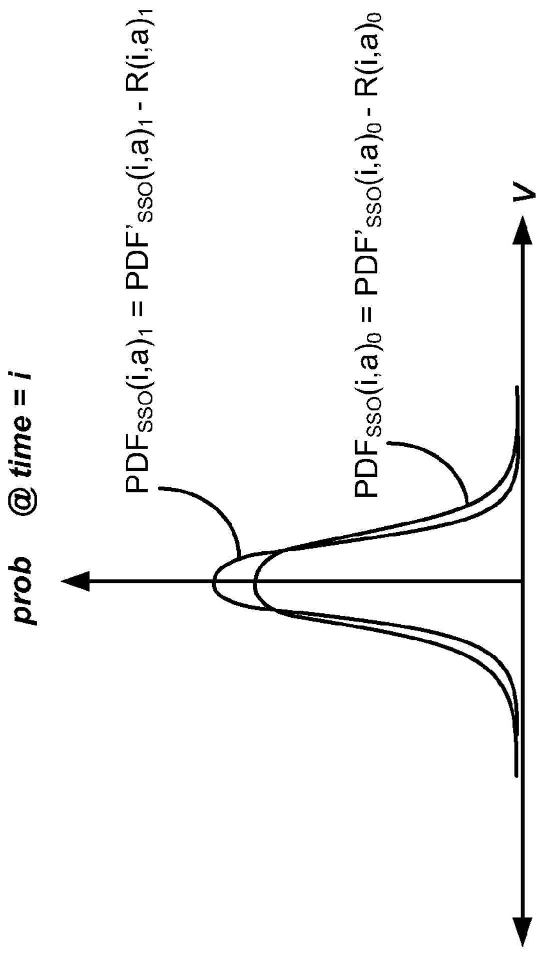

When these baseline values are subtracted (i.e., $PDF'_{SSO}(i,a)_x-R(i,a)_x$), the desired $PDF_{SSO}(i,a)_x$ is achieved for both logic states, as shown in FIG. 8D. As with $PDF_{XTALK}$ discussed earlier (FIG. 7G), $PDF_{SSO}(i,a)$ comprises a spread relative to zero (although not necessarily centered at zero as shown). Note that $PDF_{SSO}$ is indexed to a particular channel (e.g., channel 14*a*), and thus similar PDFs would be generated for each other channel by repeating the above simulation, e.g., by placing the test pattern on channel 14*b*, etc.

Figure 8E:
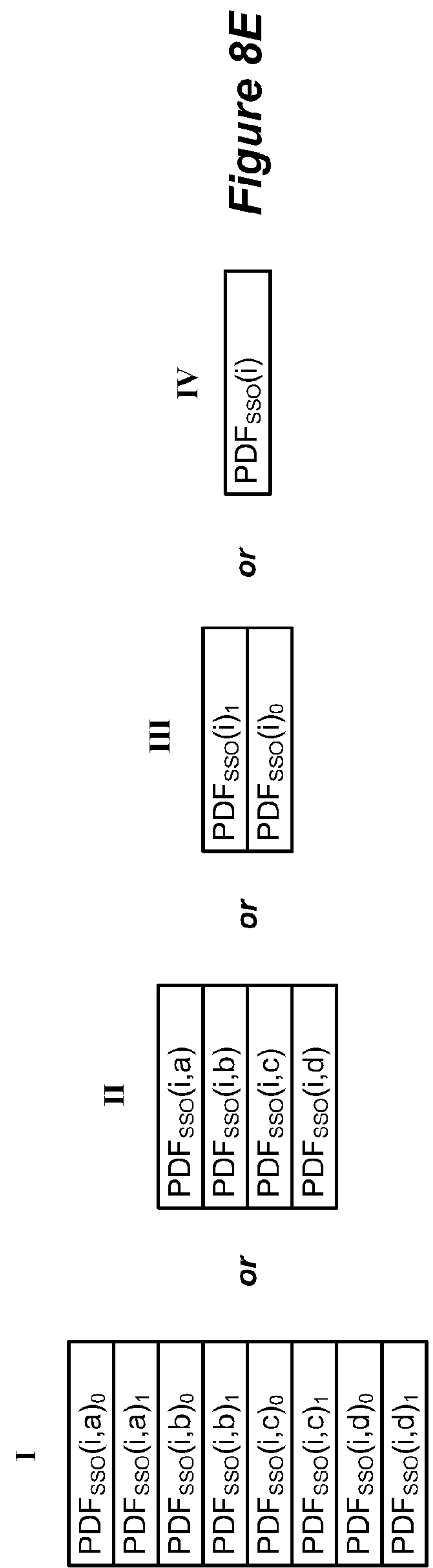

FIG. 8E summarizes the various $PDF_{SSO}$ terms that can be computed and used in the disclosed technique. If it is desired or indicated to compute $PDF_{SSO}$ for each of channels 14*a*-14*d* separately and for each logic state, the terms of Scenario I are used, which will require simulation (R(n), $R(n)_{SSO}$) through each of the channels. If separate $PDF_{SSO}$ are desired for each channel, but one is not concerned about differences in the different logic states, then the terms in Scenario II can be used. The Scenario II terms could involve simply ignoring one of the portions of the test pattern responses, or convolving the logic states together for each channel (e.g. $PDF_{SSO}(i,a)=PDF_{SSO}(i,a)_0*PDF_{SSO}(i,a)_1$). If one is mainly concerned about differences in the PDFs resulting from differences in the logic states, but is not concerned with differences between the channels, the terms of Scenario III can be used. Here, only one channel need be simulated. Alternatively, the non-channel-indexed terms in Scenario III can be arrived at by convolving each of the channels together for a given logic state (e.g. $PDF_{SSO}(i)_1=PDF_{SSO}(i,a)_1*PDF_{SSO}(i,b)_1* \ldots$). If one is not concerned with the differences between the channels or the logic states, the $PDF_{SSO}$ in Scenario IV can be used. Alternatively, the $PDF_{SSO}$ of Scenario IV can be arrived at from convolving all of the terms from Scenario I for example.

Figure 9A:
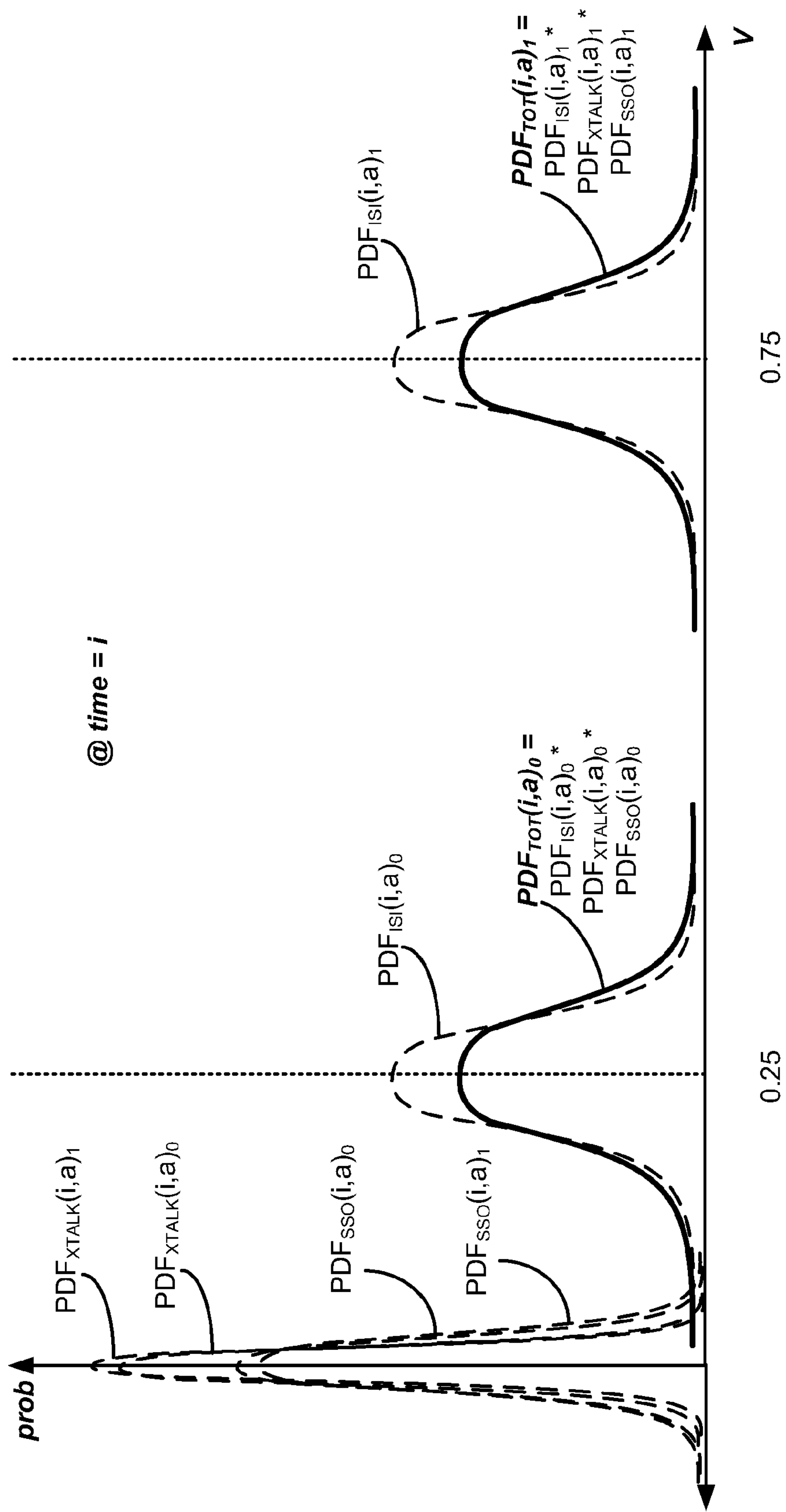
FIGS. 9A, 9B, and 9C illustrate each of $PDF_{ISI}$, $PDF_{XTALK}$, $PDF_{SSO}$, and $PDF_{TOT}$.

Now that the generation of $PDF_{ISI}$, $PDF_{XTALK}$, and $PDF_{SSO}$ have been explained, attention returns to convolution of those terms together to arrive at a $PDF_{TOT}$ which is inclusive of each of these non-idealities, and results in a more realistic distribution. FIG. 9A shows the individually-produced $PDF_{ISI}$, $PDF_{XTALK}$, and $PDF_{SSO}$ terms for each logic state, and the convolution of those distributions to arrive at $PDF_{TOT}$, as set forth earlier in the equations of FIG. 5. As shown, each term is indexed to a particular channel 'a' on the bus, although as mentioned earlier not all terms need be so indexed. $PDF_{ISI}$ terms are centered around their unit interval cursor value terms, a feature resulting from both Casper's technique and the techniques disclosed in the above-incorporated concurrent application, which is not further discussed. The $PDF_{XTALK}$ and $PDF_{SSO}$ terms by contrast are referenced to (and generally centered around) zero. This results from the particulars by which these PDFs were created: cross talk was measured in FIG. 7 as an amount of noise varying from ground, and SSO was normalized from its baseline value ($R(i,a)_x$) in FIG. 8. When these various PDFs are convolved then, the resulting $PDF_{TOT}$ can be viewed as a broadening of the $PDF_{ISI}$ by both of the corresponding terms $PDF_{XTALK}$ and $PDF_{SSO}$.

Figure 9B:
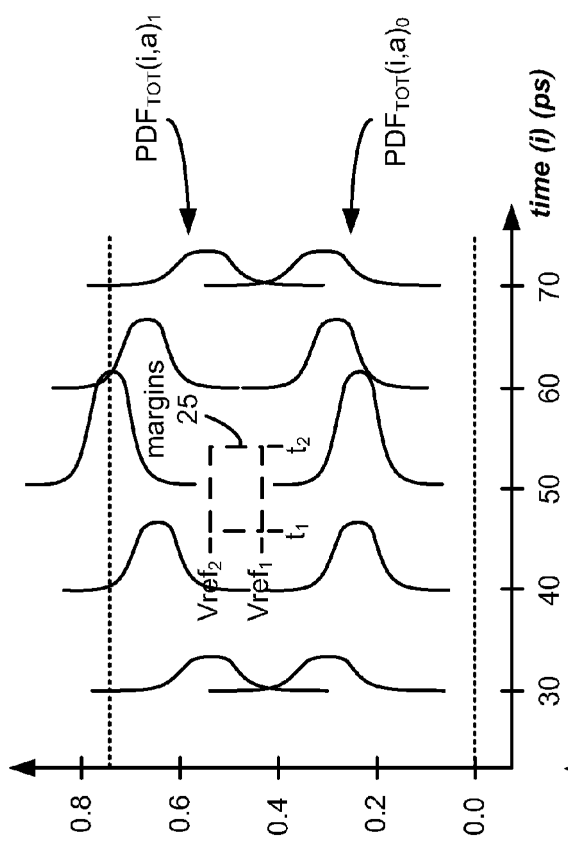
Figure 9C:
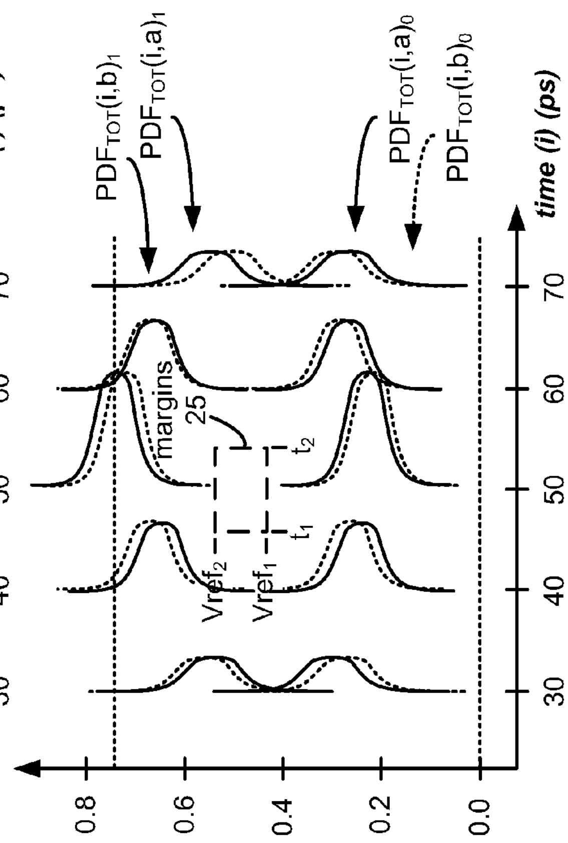

Terms $PDF_{ISI}$, $PDF_{XTALK}$, and $PDF_{SSO}$ can be recalculated for different times 'i' across the unit interval for the channel of interest (e.g., channel 14*a*), resulting in a continuum of $PDF_{TOT}$ as shown in FIG. 9B. The statistics embodied in the PDFs of FIG. 9B allow sensing reliability to be assessed, and appropriate sensing margins 25 to be set to arrive at a suitable bit error rate, as discussed earlier. If it is necessary or useful to repeat the above for a next channel (e.g., channel 14*b*), then new simulations can be run (pulses on channel 14*b* in FIG. 6; assessment of cross talk noise on channels 14*a, c*, and *d* in FIG. 7; running the test pattern on channel 14*b* in FIG. 8, etc.), new PDFs determined, new calculations made at various times 'i' across the unit interval, etc., to arrive at a new continuum of $PDF_{TOT}$ for channel 'b', as shown in FIG. 9C.

FIGS. 10A-10F illustrate a modification to the disclosed technique in which $PDF_{SSO}$ and $PDF_{XTALK}$ are determined together via one simulation to form $PDF_{SSO,XTALK}$, which is a PDF indicative of both SSO and cross talk non-idealities. While this modification does not allow SSO and cross talk to be separately determined and assessed, the resulting $PDF_{SSO,XTALK}$ will capture both effects. Essentially, this modification allows the designer to skip the separate cross talk simulations and calculations of FIGS. 7A-7H, which can simplify the overall technique in arriving at $PDF_{TOT}$.

Figure 10A:
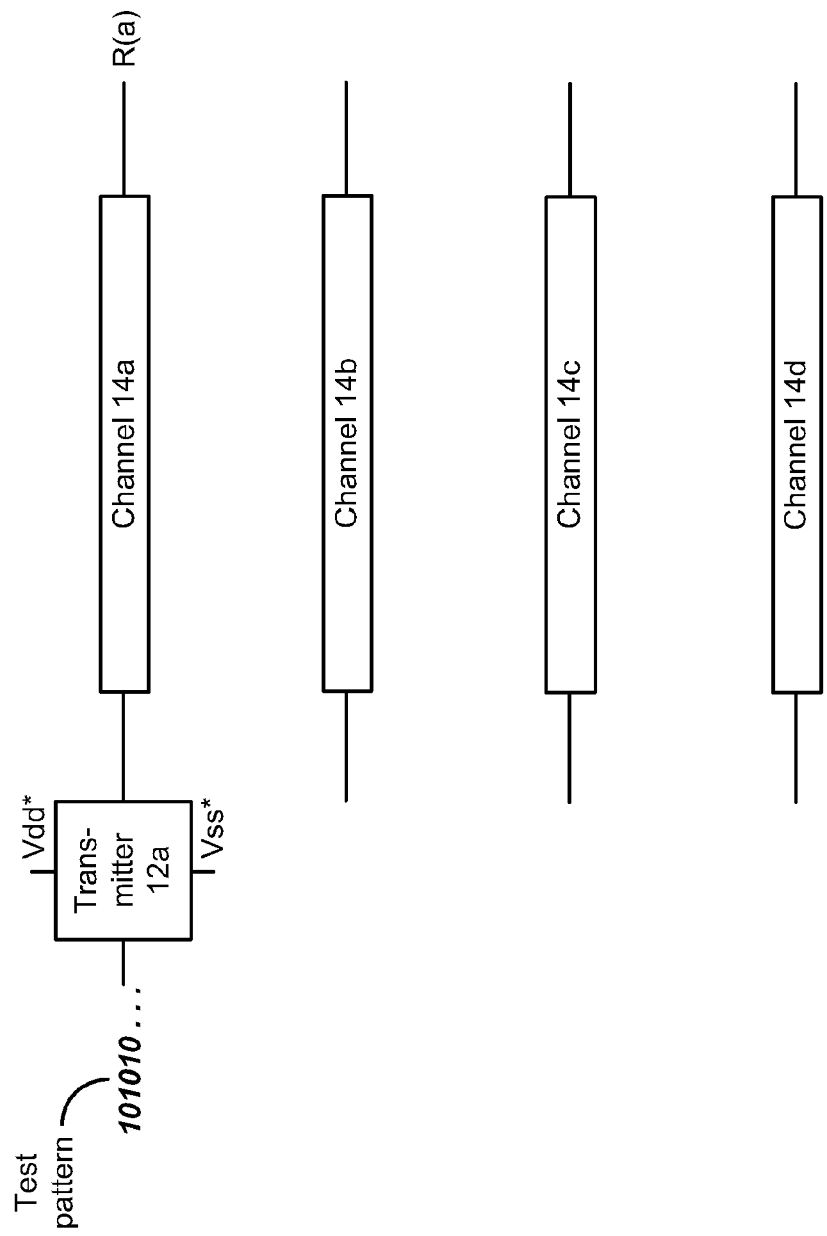
FIGS. 10A-10F illustrate a modification to the technique where $PDF_{SSO}$ and $PDF_{XTALK}$ are determined together via a single simulation to form a combined $PDF_{SSO,XTALK}$.

Starting with FIG. 10A, this baseline test pattern response R(a) is generated, just as it was with respect to FIG. 8A. By way of reminder, a test pattern (e.g., 101010 . . . ) is input to a transmitter on a given channel, such as 14*a*. Ideal, constant power supply voltages Vdd* and Vss* are used, and the channel of interest is also decoupled from all other channels using the simulation software (compare FIG. 7A). The resulting baseline test response, R(a), is indexed to the channel, and is shown in FIG. 10C, which again is similar to R(a) depicted in FIG. 8C.

Figure 10B:
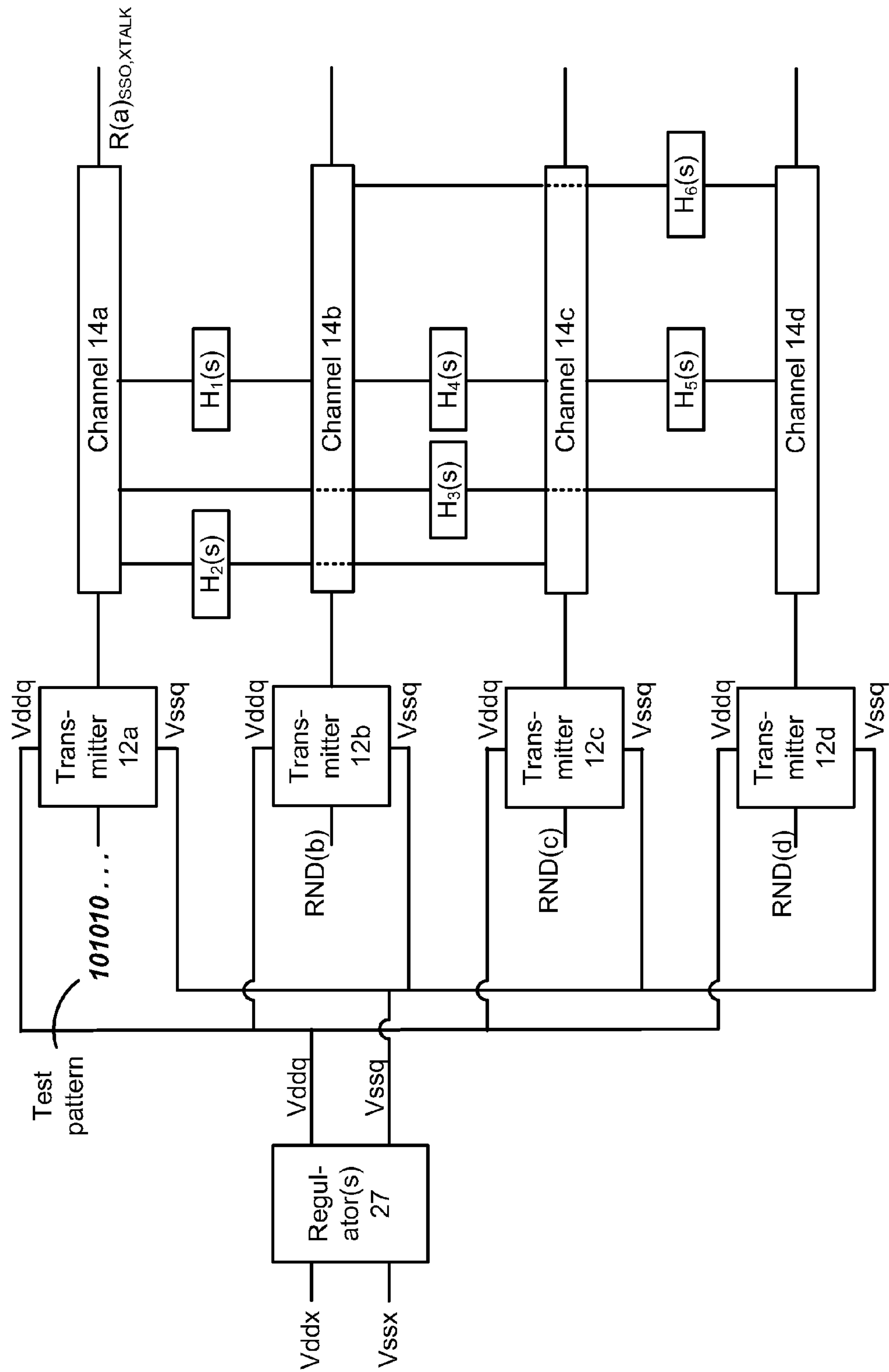

The next step in the process is shown in FIG. 10B, which again involves the simulation of the same test pattern (101010 . . . ) over some number of cycles, and the additional random inputs, RND(n), on all other data inputs, similar to what was illustrated in FIG. 8B. Like FIG. 8B, FIG. 10B shows that ideal power supply voltages Vdd* and Vss* are not used at the transmitters 12, and indeed the entirety of the power distribution network is preferably included in the simulation. Thus, the transmitter power supplies, Vddq and Vssq, are allowed to vary and will depending on the switching of logic states at the transmitters. However, and differently from FIG. 8B, the channels are coupled in the simulation software, and thus it can be seen that the transfer functions between each ($H_x(s)$) have been included. What results on the channel of interest is the test pattern as affected by SSO arising from the switching of the transmitters 12$a$-12$d$ and potential loading of the power supply voltage Vddq and Vssq, and cross talk experienced on the channel of interest coupled from the channels having the random inputs. This response is referred to here as the SSO/XTALK-randomized test pattern response, $R(a)_{SSO,XTALK}$.

As with FIG. 8B, it is desired to run the SSO/XTALK-randomized test pattern response ($R(a)_{SSO,XTALK}$) simulation of FIG. 10B for a larger number of cycles, in particular to capture SSO, which may need more than $2^n$ cycles, perhaps $100*2^n$ cycles, as discussed before.

Figure 10C:
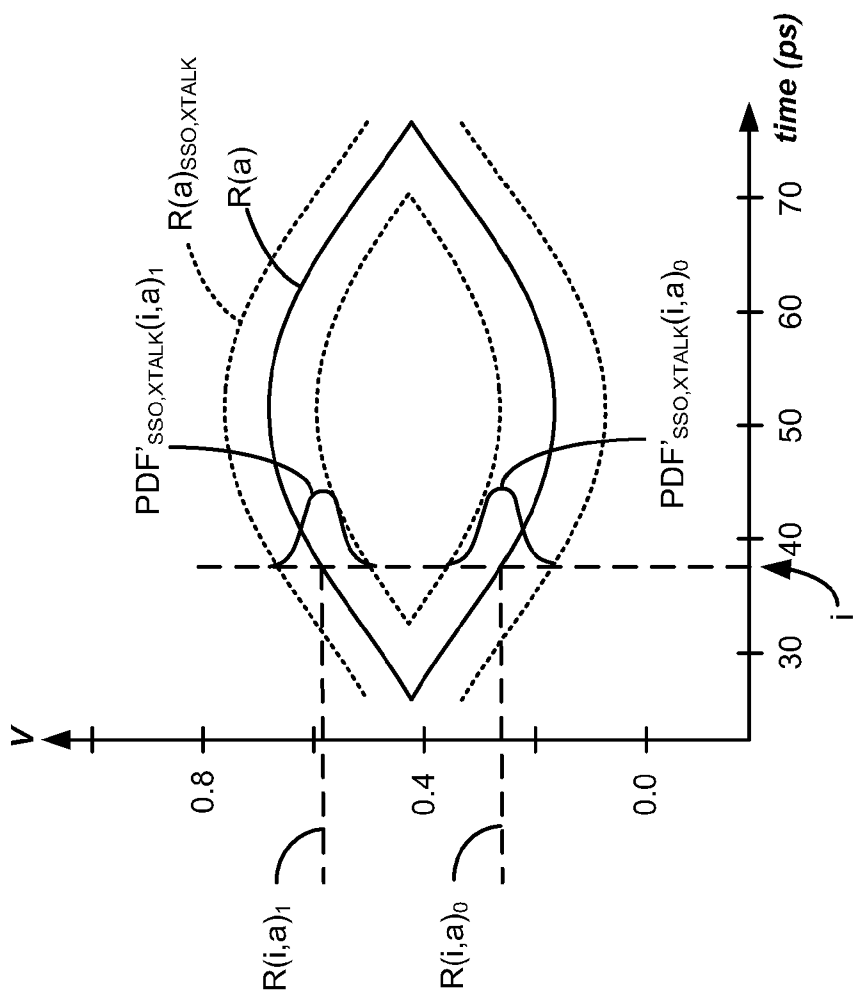

The resulting cycles of the SSO/XTALK-randomized test pattern response, $R(a)_{SSO,XTALK}$, are seen in FIG. 10C overlaid in an eye diagram format. Processing of the histogram data represented in FIG. 10C ($PDF_{SSO,XTALK}(i,a)_x$) is similar to that discussed in FIG. 8C, and again is not derived by convolution as was the terms $PDF_{ISI}$ discussed in FIG. 6. It can be useful in subsequent steps to smooth, resample, or curve-fit these distributions in the computer system.

Figures 10D, 10E:
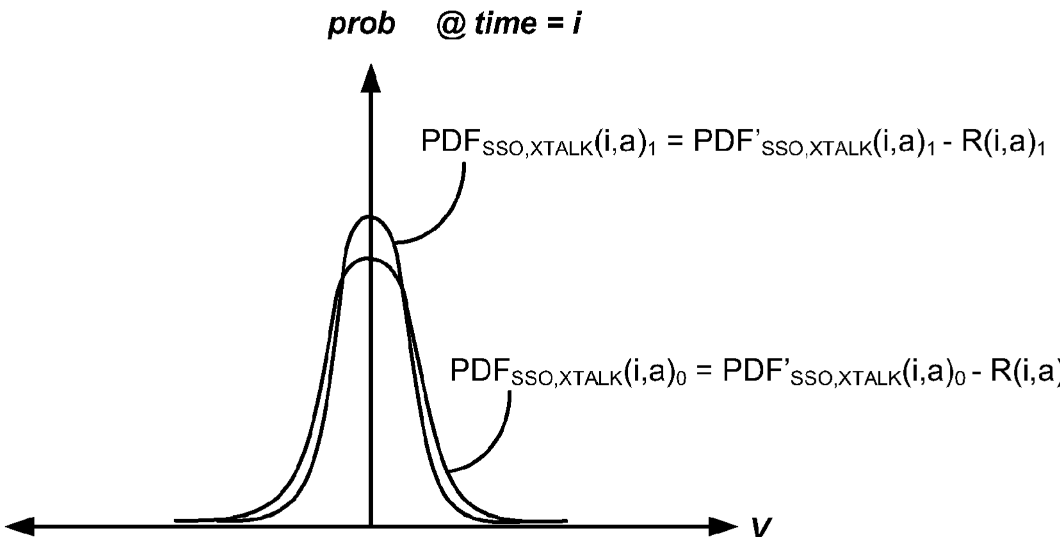

When the baseline values are subtracted (i.e., $PDF'_{SSO,XTALK}(i,a)_x - R(i,a)_x$), the desired $PDF_{SSO,XTALK}(i,a)_x$ is achieved for both logic states, as shown in FIG. 10D. The combined $PDF_{SSO,XTALK}$ comprises a spread relative to zero (although not necessarily centered at zero), which is not surprising because the two phenomenon captured in this PDF are themselves centered around zero, as previously discussed.

FIG. 10E summarizes the various $PDF_{SSO,XTALK}$ terms that can be computed and used in this modification of the disclosed technique. If it is desired or indicated to compute $PDF_{SSO,XTALK}$ for each of channels 14$a$-14$d$ separately and for each logic state, the terms of Scenario I are used, which will require simulation (R(n), R(n) through each of the channels. If separate $PDF_{SSO,XTALK}$ are desired for each channel, but one is not concerned about differences in the different logic states, then the terms in Scenario II can be used. The Scenario II terms could involve simply ignoring one of the portions of the test pattern responses, or convolving the logic states together for each channel (e.g. $PDF_{SSO,XTALK}(i,a) = PDF_{SSO,XTALK}(i,a)_0\ PDF_{SSO,XTALK}(i,a)_1$). If one is mainly concerned about differences in the PDFs resulting from differences in the logic states, but is not concerned with differences between the channels, the terms of Scenario III can be used. Here, only one channel need be simulated. Alternatively, the non-channel-indexed terms in Scenario III can be arrived at by convolving each of the channels together for a given logic state (e.g. $PDF_{SSO,XTALK}(i)_1 = PDF_{SSO,XTALK}(i,a)_1 * PDF_{SSO,XxTALK}(i,b)_1 * \ldots$). If one is not concerned with the differences between the channels or the logic states, the $PDF_{SSO,XTALK}$ in Scenario IV can be used. Alternatively, the $PDF_{SSO,XTALK}$ of Scenario IV can be arrived at from convolving all of the terms from Scenario I for example.

Figure 10F:
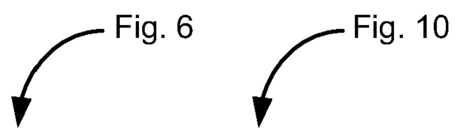

FIG. 10F illustrates how $PDF_{SSO,XTALK}$ is used in the computation of $PDF_{TOT}$, and comprises a modification to the generic equations of FIG. 5, presented earlier. In this simpler computation, $PDF_{ISI}$ (itself derived from convolution) is convolved with the $PDF_{SSO,XTALK}$ term (derived from simulation). Once $PDF_{TOT}$ has been determined in this manner, it can be used per FIG. 9A-9C to assess reliability, set sensing margins, etc.

FIGS. 11A-11E recognize that it may not be necessary to use all of the component terms, all channels, all logic levels, etc., to arrive at useful $PDF_{TOT}$ in accordance with embodiment of the disclosed technique, and these figures describe some variations that can be used in the calculations. In FIG. 11A, the cross talk term, $PDF_{XTALK}$, has been omitted, which can be indicated if only ISI and SSO are of primary concern in a given system under simulation. In such an embodiment, the simulation and processing of FIG. 7 can be dispensed with.

In FIG. 11B, cross talk terms are used only for neighboring channels, such as was described earlier in conjunction with FIG. 7D. Using fewer cross talk terms will simplify the processing needed in the computer system, and is sensible when cross talk is negligible on distant channels in the bus.

In FIG. 11C, SSO is determined generically for the system, instead of being referenced to a given channel, akin to Scenario III in FIG. 8E. This is a useful simplification when one considers that SSO may be mostly a function of the regulator(s) 27 and power distribution circuitry (see, e.g., FIG. 8B), and may only be affected by particular channels as a second order (inconsequential) variable.

In FIG. 11D, all indexing to particular channels has been dispensed with, amounting to the use of PDF terms from Scenario III in each of FIGS. 6E, 7H, and 8E. The resulting $PDF_{TOT}(i)x$, therefore is used generally to characterize the reliability on any of the channels, and operates from the assumption that no particular channel would exhibit non-linearities not shared by another channel.

In FIG. 11E, the cross talk and SSO terms are not indexed to a particular logic state, amounting to use of the terms from Scenario II in FIGS. 7H and 8E. This can be a reasonable computational shortcut, particularly if one is not convinced that the logic states have noticeable differences on cross talk or SSO noise, or if simulation confirms that understanding.

FIG. 11F represents the same formula as illustrated in FIG. 11E, but with the combined $PDF_{SSO,XTALK}$ term (from FIG. 10) used instead of separates terms $PDF_{SSO}$ (FIG. 8) and $PDF_{XTALK}$ (FIG. 7). This combined PDF term could also be used in any of the formulas in FIGS. 11A-11D as well, although this has not been illustrated for clarity.

Other formulations pulling terms from the different scenarios are possible, and may very well depend on what the designer notices through simulation or from practical experience. For example, if a particular variable such as logic state or channel number is not noticed to have profound effects on a given phenomenon-ISI, cross talk, or SSO-then the terms used to compute $PDF_{TOT}$ can be simplified accordingly to not include such uninteresting effects. Additionally, other types of phenomenon giving rise to reliability concerns other than ISI, cross talk, and SSO could also be modeled and included in the $PDF_{TOT}$ calculation.

The disclosed techniques are extendable to multi-level signaling, such as in schemes in which logic states are represented by more than two voltage levels (e.g., logic V=Vssq, logic '1'=(Vddq+Vssq)/2, logic '2'=Vddq). Because the various terms disclosed herein are indexable to particular logic states, it is a simple matter to extend such techniques to the simulation of multi-level signals.

Figure 12:
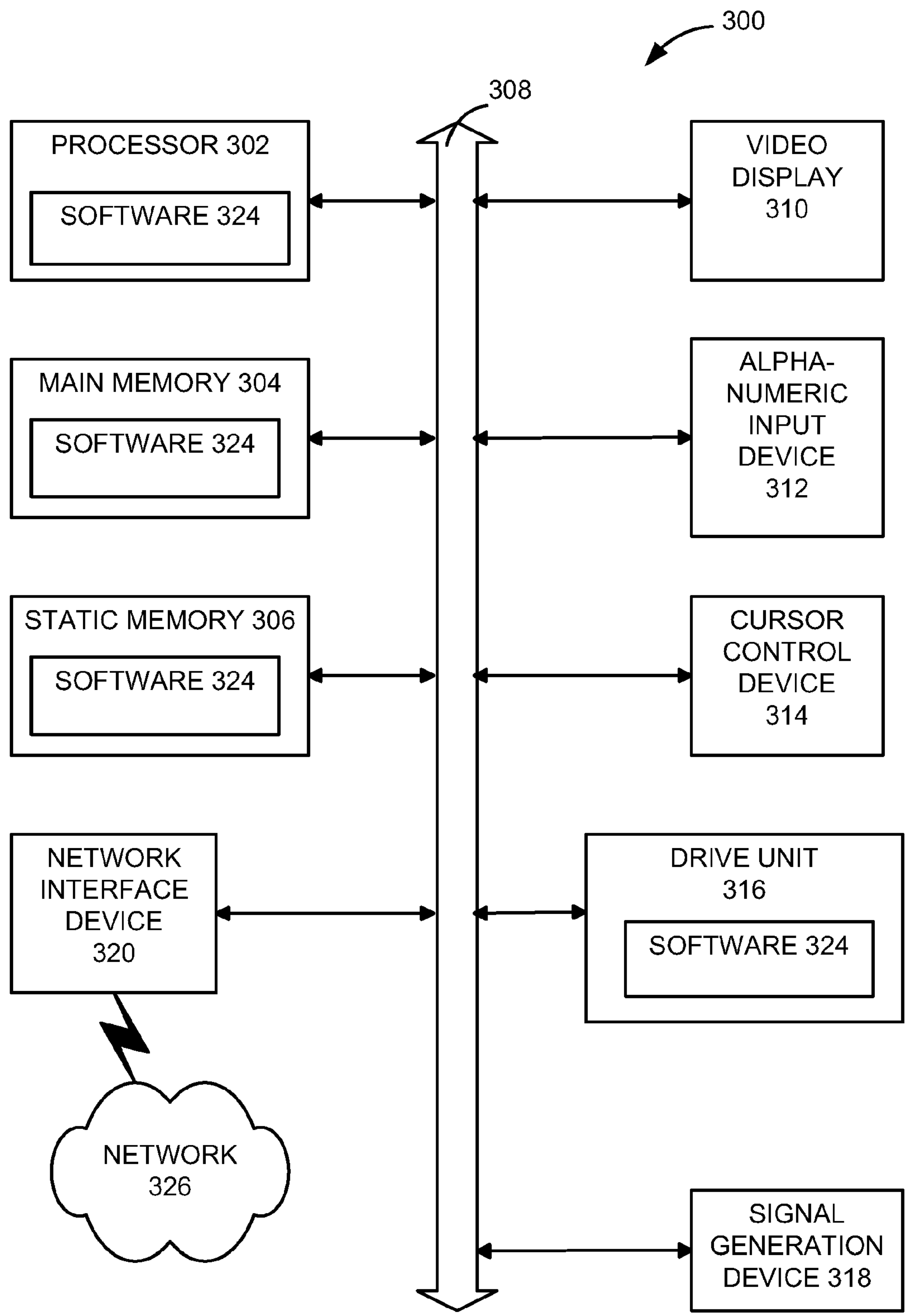
FIG. 12 illustrates an example computer system in which the disclosed technique may be operated.

One skilled in the art will realize that the disclosed techniques are usefully implemented as software 324 running on a computer system, such as computer system 300 illustrated in FIG. 12. The technique can be encoded as software on one or more computer readable media, such as a magnetic or optical disk, semiconductor memory, or other media known in the art for holding software. Such a computer system can be broadly construed as any machine or system capable or useful in reading and executing instructions in the software and making the various computations the disclosed techniques require. Usually, embodiments of the disclosed techniques would be implemented as software installable on a circuit designer's workstation or work server. Moreover, embodiments of the disclosed techniques can easily be incorporated into pre-existing circuit simulation software packages. Different software packages or modules can be used to perform different aspects of the technique. For example, simulation can occur using simulation software such as SPICE™, while remaining analysis-generation of the PDFs by convolution—can occur using another software program such as Matlab™.

Computer system 300 can operate as a standalone device or may be connected (e.g., networked) to other computer systems. In a networked deployment, the system 300 may operate in the capacity of a server or a client machine in a server-client network environment, or as a peer machine in a peer-to-peer (or distributed) network environment. The computer system 300 may include a personal computer (PC), a workstation such as those typically used by circuit designers, a set-top box (STB), a Personal Digital Assistant (PDA), a cellular telephone, a web appliance, a network router, switch or bridge, or any machine capable of executing a set of instructions within the software, and networked versions of these.

To provide for interaction with a user, computer system 300 can include a video display 310 for displaying information to the user, and may also include a printer (not shown) for providing hard copies of the results. An alpha-numeric input device 312 (e.g., a keyboard), and a cursor control device 314 (e.g., a mouse) can be used to allow the user to provide input to the computer system. Other input devices may be used as well. Data (such as the magnitudes and durations of the ideal pulses 20, 30; the transfer functions for the channel and transmitter, or their electrical parameters, etc.) can be input to the computer system 300 using such input devices, or such data can be loaded in from memory or from a library within the computer system 300.

The exemplary computer system 300 includes a processor 302 (e.g., a central processing unit (CPU), a graphics processing unit (GPU) or both), a main memory 304 and a static memory 306, which communicate with each other via a bus 308. Processors 302 suitable for the execution of software 324 include both general and special purpose microprocessors, and which may be integrated or distributed in the system 300.

The computer system 300 may further include a disk drive unit 316, which includes a computer-readable medium (e.g., a disk) on which the software 324 is stored. The software 324 may also reside, completely or at least partially, within computer-readable media (e.g., semiconductor memory) in the main memory 304 or within the processor 302 during execution thereof by the computer system 300.

The software 324 and/or its associated data may further be transmitted or received over a network 326 via a network interface device 320 utilizing any one of a number of well-known transfer protocols (e.g., HTTP). Network 326 can comprise a local area network ("LAN"), a wide area network ("WAN"), the Internet, and combinations of these.

The disclosed techniques can also be implemented in digital electronic circuitry, in computer hardware, in firmware, in special purpose logic circuitry such as an FPGA (field programmable gate array) or an ASIC (application-specific integrated circuit), or in combinations of these, which again all comprise examples of computer-readable media. When implemented as software, such software can be written in any form of programming language, and can be deployed in any form, including as a stand-alone program or as a module, component, subroutine, or other unit suitable for use in a computing environment.

While preferred embodiments of the invention have been disclosed, it should be understood that the disclosed technique can be implemented in many different ways to the same useful ends as described herein. In short, it should be understood that the inventive concepts disclosed herein are capable of many modifications. To the extent such modifications fall within the scope of the appended claims and their equivalents, they are intended to be covered by this patent.

What is claimed is:

1. A method of assessing the reception of data from selected ones of channels in a bus comprising a plurality of channels, the method comprising:

performing a first simulation, using one or more processors, to determine a combined probability distribution function over a unit time interval, the combined probability distribution function being indicative of cross-talk and simultaneous switching output noise between the selected ones of channels of the plurality of channels in the bus, the combined probability distribution function being indicative of a reception of at least one logic state by a receiver coupled to the selected ones of channels, the at least one logic state being transmitted over each of the selected ones of channels by a transmitter in a communications circuit.

2. The method of claim 1, further comprising determining a separate probability distribution function for simultaneous switching output noise over the selected ones of channels caused by switching from a first logic state to a second logic state due to power supply sharing for a plurality of transmission circuits in the communications circuit.

3. The method of claim 2, further comprising determining the simultaneous switching output noise over a number of switching cycles.

4. The method of claim 2, further comprising determining the simultaneous switching output noise for each of the plurality of channels.

5. The method of claim 2, further comprising determining the simultaneous switching output noise for a particular time within the unit time interval.

6. The method of claim 1, further comprising determining a transfer function indicative of cross-coupling between the selected ones of the plurality of channels.

7. The method of claim 1, further comprising determining a separate transfer function indicative of cross-coupling for each of the plurality of channels.

8. The method of claim 1, further comprising selecting the simulation to be run with an ideal constant voltage power supply.

9. The method of claim 1, further comprising selecting the simulation to be run with an actual power supply voltage available from a selected power supply.

10. The method of claim 1, further comprising excluding cross-talk values from channels that are distal to the selected ones of the plurality of channels to reduce computational requirements.

11. The method of claim 1, further comprising determining probability distribution function data indicative of intersymbol interference at the receiver for each of the selected ones of channels.

12. The method of claim 11, further comprising convolving the probability distribution function data indicative of intersymbol interference with the combined probability distribution function to determine a total probability distribution function.

13. A method of assessing a transmission operation in a communications circuit, the method comprising:

performing a simulation, using one or more processors, to determine a simultaneous switching output noise probability distribution function over a unit time interval, the simultaneous switching output noise probability distribution function being indicative of simultaneous switching output noise between selected channels in a plurality of channels in the communications circuit, the simultaneous switching output noise probability distribution function being indicative of a reception of at least one logic state by a receiver coupled to the selected channels.

14. The method of claim 13, further comprising determining a probability distribution function for the selected channels due to cross-talk on the selected channels caused by the simultaneous switching output noise by recursively convolving cross-talk values with values of the simultaneous switching output noise probability distribution function.

15. The method of claim 14, further comprising convolving the cross-talk probability distribution function with the simultaneous switching output noise probability distribution function to determine a combined cross-talk and simultaneous switching output noise probability distribution function.

16. The method of claim 13, further comprising performing an additional simulation in a computer system to determine intersymbol interference probability distribution function data due to residual energy perturbing the at least one logic state outside of the unit time interval.

17. The method of claim 16, further comprising determining a probability distribution function for the selected channels due to the intersymbol interference and convolving the intersymbol interference probability distribution function with the simultaneous switching output noise probability distribution function to determine a combined intersymbol interference and simultaneous switching output noise probability distribution function.

18. The method of claim 13, wherein the simulation is configured to determine either a positive received pulse response or a negative positive received pulse response based on a transmitted ideal response.

19. A method, comprising:

performing a first simulation, using one or more processors, to determine a simultaneous switching output noise probability distribution function over a plurality of unit time intervals, the simultaneous switching output noise probability distribution function being indicative of simultaneous switching output noise between selected channels in a plurality of channels in the communications circuit, the simultaneous switching output noise probability distribution function being indicative of a reception of at least one logic state by a receiver coupled to the selected channels; and performing a second simulation to determine an intersymbol interference probability distribution function due to residual energy from the simultaneous switching output noise perturbing the at least one logic state outside of a select one of the plurality of unit time intervals.

20. The method of claim 19, further comprising:

determining a probability distribution function for the selected channels due to cross-talk on the selected channels caused by the simultaneous switching output noise by recursively convolving cross-talk values with values of the simultaneous switching output noise probability distribution function; and convolving the simultaneous switching output noise probability distribution function, the intersymbol interference probability distribution function, and the cross-talk probability distribution function to determine a total probability distribution function for the selected channels.

21. The method of claim 20, wherein a particular time unit interval over each of the probability distribution function terms is selectable from within the plurality of time unit intervals to construct an eye-diagram.

22. The method of claim 20, wherein a particular logic state can be selected for each of the probability distribution function terms to determine asymmetry of transmission between select ones of a plurality of logic states.

* * * * *